United States Patent
Lee et al.

(10) Patent No.: US 10,453,094 B2
(45) Date of Patent: Oct. 22, 2019

(54) SYSTEM, APPARATUS, AND METHOD TO PROVIDE LOCATION-BASED SERVICE

(71) Applicant: Samsung Electronics Co., Ltd., Suwon-si (KR)

(72) Inventors: Jongwook Lee, Seongnam-si (KR); Sang-joon Kim, Hwaseong-si (KR); Seungkeun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 854 days.

(21) Appl. No.: 14/945,825

(22) Filed: Nov. 19, 2015

(65) Prior Publication Data

US 2016/0267538 A1    Sep. 15, 2016

(30) Foreign Application Priority Data

Mar. 10, 2015 (KR) .................. 10-2015-0033100
Jun. 26, 2015 (KR) .................. 10-2015-0091045

(51) Int. Cl.
G06Q 30/02 (2012.01)
H04W 56/00 (2009.01)
H04W 4/029 (2018.01)
H04W 4/02 (2018.01)

(52) U.S. Cl.
CPC ..... *G06Q 30/0264* (2013.01); *G06Q 30/0261* (2013.01); *G06Q 30/0267* (2013.01); *H04W 4/029* (2018.02); *H04W 56/001* (2013.01); *H04W 56/0015* (2013.01)

(58) Field of Classification Search
CPC ........... G06Q 30/0251; G06Q 30/0261; G06Q 30/0264; G06Q 30/0267; H04W 4/021; H04W 4/023; H04W 52/0261; H04W 56/001

USPC .......................................... 370/350; 709/224
See application file for complete search history.

(56) References Cited

U.S. PATENT DOCUMENTS

| | | | |
|---|---|---|---|
| 6,664,982 B1 * | 12/2003 | Bi | H04L 67/06 345/169 |
| 2007/0213101 A1 * | 9/2007 | Oh | H04W 28/14 455/572 |
| 2009/0086702 A1 | 4/2009 | Julian et al. | |
| 2009/0092122 A1 * | 4/2009 | Czaja | H04L 7/041 370/350 |

(Continued)

FOREIGN PATENT DOCUMENTS

| JP | 2014-518492 A | 7/2014 |
|---|---|---|
| KR | 10-2009-0035688 A | 4/2009 |

(Continued)

OTHER PUBLICATIONS

Extended European Search Report dated Apr. 21, 2016 in counterpart European Application No. 16151832.9.

(Continued)

*Primary Examiner* — Kevin T Bates
*Assistant Examiner* — Chen-Liang Huang
(74) *Attorney, Agent, or Firm* — NSIP Law

(57) ABSTRACT

Provided is a system, apparatus, and method that includes selectively providing and/or receiving advertisement information from an advertiser based on a coarse synchronization, that provides the advertisement information within expected preset time durations based on a received synchronization signal.

53 Claims, 12 Drawing Sheets

(56) References Cited

U.S. PATENT DOCUMENTS

| | | | | |
|---|---|---|---|---|
| 2009/0094111 A1* | 4/2009 | Wu | ........................ | G06Q 30/02 705/14.1 |
| 2010/0284316 A1* | 11/2010 | Sampathkumar | ........................... | H04W 52/0216 370/311 |
| 2011/0320256 A1* | 12/2011 | Florucci | ............. | G06Q 30/0226 705/14.33 |
| 2013/0132500 A1* | 5/2013 | Vandwalle | ............ | H04L 67/104 709/208 |
| 2013/0138831 A1 | 5/2013 | Patil et al. | | |
| 2014/0082185 A1 | 3/2014 | Abraham et al. | | |
| 2014/0153440 A1* | 6/2014 | Zhou | ..................... | H04W 40/12 370/254 |
| 2015/0295700 A1* | 10/2015 | Gomez Gutierrez | ..... | G06F 1/14 375/354 |
| 2015/0317684 A1* | 11/2015 | Abir | ....................... | G06Q 30/02 705/14.64 |
| 2016/0119931 A1* | 4/2016 | Soriaga | ................. | H04W 8/005 370/329 |

FOREIGN PATENT DOCUMENTS

| | | | | |
|---|---|---|---|---|
| KR | 10-2009-0055150 A | 6/2009 | | |
| KR | 10-2009-0123927 A | 12/2009 | | |
| KR | 10-2010-0075569 A | 7/2010 | | |
| KR | 10-2013-0091098 A | 8/2013 | | |
| KR | 10-2014-0101828 A | 8/2014 | | |
| WO | WO 2014068366 A1 * | 10/2012 | ............ | H04W 28/12 |
| WO | WO 2013/003753 A2 | 1/2013 | | |
| WO | WO 2013/082479 A1 | 6/2013 | | |
| WO | WO 2014/068366 A1 | 5/2014 | | |

OTHER PUBLICATIONS

European Office Action dated May 11, 2017 for the Corresponding European Application No. 16151832.9 (7 pages, in English).

* cited by examiner

1200

SYSTEM, APPARATUS, AND METHOD TO PROVIDE LOCATION-BASED SERVICE

CROSS-REFERENCE TO RELATED APPLICATION(S)

This application claims the benefit under 35 USC 119(a) of Korean Patent Application No. 10-2015-0033100 filed on Mar. 10, 2015 and Korean Patent Application No. 10-2015-0091045 filed on Jun. 26, 2015 in the Korean Intellectual Property Office, the entire disclosures of which are incorporated herein by reference for all purposes.

BACKGROUND

1. Field

The following description relates to a system, apparatus, and method to provide a location-based service.

2. Description of Related Art

With increasing interest in the Internet of things (IoT), various services are being developed based on the IoT. A location-based service (LBS) that provides, for example, a service for mobile payment and indoor location tracking, and other customized information may be used. In terms of providing the LBS, a basic operation may be to discover an adjacent device. A wearable device, for example, having a small battery may consume a relatively large amount of its energy to discover the adjacent device compared to the relative amount of energy used by a device having a high-capacity battery.

In addition, when such an LBS is used with one or more retail advertiser devices, for example, so that that a user of the wearable device, as only an example, may be provided information about such retailers potentially dependent on the location of the wearable device, a similar problem occurs as such retail advertiser devices may broadcast their discovery information at set times independent of each other and independent of when the wearable device may or may not be attempting to discover such retail advertiser devices based on receipt of such broadcast discovery information. For example, the wearable device may enter a discover mode with a fixed duty cycle that may eventually intersect with one or more of the retail advertiser devices' broadcasts, or the wearable device may be set in an always-on discover mode which will more quickly wear down the battery of the wearable device. Accordingly, both options have drawbacks and both options will use more energy than desirable to discover and then communicate with such retail advertiser devices.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

One or more embodiments provide a method, including controlling an advertiser to receive a synchronization signal transmitted by a remote external synchronizer, performing a coarse synchronization between a transmission time set for the advertiser to transmit an advertisement packet and a preset time duration, indicated by the synchronization signal, set the transmission time, and controlling the advertiser to transmit the advertisement packet at the set transmission time.

The method may further include controlling the advertiser to perform, at a select later time and before another advertisement packet transmission by the advertiser, another coarse synchronization to set another transmission time of another advertisement packet so as to be predicted to be transmitted by the advertiser within the preset time duration, and transmitting the other advertisement packet at the set other transmission time, wherein the select later time is based on a preset interval between one or more advertisement windows of the preset time duration that the advertisement packet and the other advertisement packet are respectively transmitted within.

The method may further include determining whether to perform a re-synchronization of the advertiser and the synchronizer based on whether a predetermined period of time or preset number of advertisement windows have passed since a previous synchronization of the advertiser and the synchronizer, controlling the advertiser to selectively listen for another synchronization signal from the synchronizer based on the determining of whether the perform the re-synchronization, the synchronizer having transmitted at least one intermediate synchronization signal available for reception by the advertiser since the advertiser received the synchronization signal and before receipt of the other synchronization signal, setting a next transmission time of a next advertisement packet determined to be within the preset time duration based on the received other synchronization signal, and transmitting the next advertisement packet, by the advertiser, at the set next transmission time.

The method may further include changing an operation power mode of the advertiser to a lesser power using mode based on the transmitting of the advertisement packet, changing the operation power mode of the advertiser to a greater power using mode at a select later time and performing, at the greater power using mode, another coarse synchronization based on the synchronization signal to set another transmission time of another advertisement packet so as to be predicted to be transmitted by the advertiser within the preset time duration, and transmitting the other advertisement packet at the set other transmission time, wherein the select later time is based on a preset interval between one or more advertisement windows of the preset time duration that the advertisement packet and the other advertisement packet are respectively transmitted.

The performing of the coarse synchronization may include setting, based on the synchronization signal, a random time point within an advertisement window corresponding to a time duration in which the advertiser is anticipated by a user terminal to transmit the advertisement packet, as the transmission time of the advertisement packet.

The controlling of the transmitting of the advertisement packet may include transmitting the advertisement packet in a random slot among a plurality of preset slots of the advertisement window.

Respective advertisement transmission intervals, each representing an interval between same preset time durations for select advertisement packets, may be differently set for each of plural advertisers, including the advertiser, and wherein, in the controlling of the transmitting of the advertisement packet, the set transmission time may be determined by adding a random jitter to an advertisement transmission interval set for the advertiser.

The method may further include controlling another advertiser to perform coarse synchronization to set a transmission time for an other advertisement packet by the other advertiser, by adding a random jitter to an advertisement transmission interval set for the other advertiser different from the advertisement transmission interval set for the advertiser.

The controlling of the advertiser to receive the synchronization signal may include controlling the advertiser to intermittently listen for the synchronization signal transmitted by the synchronizer or to listen for every synchronization signal transmitted by the synchonizer.

The method may further include determining a point in time to listen for a next synchronization signal by predicting a distortion generated in the coarse synchronization indicating whether the advertiser and the synchronizer are no longer synchronized, switching an operation mode of the advertiser from an active mode to a sleep mode a predetermined time immediately after the transmission of the advertisement packet, and switching the operation mode of the advertiser from the sleep mode to the active mode, based on the determined point in time, to listen for the next synchronization signal.

The determined point in time to listen for the next synchronization signal may be based on a determination of whether a predetermined number of intervals of the preset time duration, in which advertisement packets have been respectively transmitted by the advertiser, have passed since the transmitting of the advertisement packet.

The synchronization signal may respectively include at least one of information indicating an interval of an advertisement window for the advertisement packet, information indicating a duration of the advertisement window, and information regarding a store related to the advertisement packet, wherein the advertisement window corresponds to the preset time duration in which the advertiser transmits the advertisement packet.

The advertisement window may include a plurality of preset slots available for plural advertisers, including the advertiser, to provide respective advertisement packets within the advertisement window.

Each of the plural advertisers may randomly transmit the respective advertisement packets within the advertisement window using any of the plurality of preset slots.

The advertisement window may include a plurality of preset slots available for multiple advertisers, and wherein a plurality of advertisers, including the multiple advertisers, may be grouped into different sets based on a preset reference, and a different advertisement window designated for each set of the grouped advertisers, with the multiple advertisers being grouped within one set of the grouped advertisers and the advertisement window of the transmitted advertisement packet providing advertisement packets for the one set of the grouped advertisers differently from another advertisement window set to provide other advertisement packets of another set of the grouped advertisers.

The method may further include controlling each of the multiple advertisers to respectively transmit each of the advertisement packets for the advertisement window, where the multiple advertisers may be grouped as the one set of grouped advertisers based on each of the multiple advertisers representing related different stores.

The method may further include controlling each of the multiple advertisers to respectively transmit each of the advertisement packets for the advertisement window, where the multiple advertisers may be grouped as the one set of grouped advertisers based on each of the multiple advertisers representing a same store, and the other set of grouped advertisers includes advertisers that are grouped based on representing a different same store.

The advertisement window may include a plurality of preset slots for different advertisement packets, and wherein a plurality of advertisement packets, including the different advertisement packets, may be grouped into different sets based on a preset reference, and a different advertisement window designated for each set of the grouped advertisement windows, with the different advertisement packets being grouped within one set of the grouped advertisement packets and the advertisement window of the transmitted advertisement packet providing for the different advertisement packets differently from another advertisement window set to provide other advertisement packets of another set of the grouped advertisement packets.

The method may further include controlling another advertiser to respectively transmit each of the other advertisement packets for the other advertisement window, where the different advertisement packets may be grouped as the one set of grouped advertisement packets based on each of the different advertisement packets representing a same store, and the other set of grouped advertisement packets may be grouped based on the other advertisement packets representing a different same store.

A advertisement window, corresponding to the preset time duration in which the advertiser transmits the advertisement packet, may include a plurality of preset slots respectively provided for an advertisement packet to be transmitted by the advertiser for each store located within transmission coverage of the advertiser.

The advertiser may be controlled to receive the synchronization signal from the synchronizer, as a first synchronizer, to perform the coarse synchronization and to transmit the advertisement packet, and the advertiser may be controlled to listen for another synchronization signal from a second synchronizer at a later time to transmit a later advertisement packet, with the advertiser having transmitted an additional advertisement packet, based on the synchronization signal from the first synchronizer, since the transmitting of the advertisement packet and before the listening for the other synchronization signal.

The method may further include controlling one or more synchronizers, including the synchronizer, to transmit respective synchronization signals to a user terminal.

The controlling of the one or more synchronizers may include controlling a first synchronizer to transmit an initial synchronization signal, defining at least the preset time duration, to the user terminal based on proximity of the user terminal and the first synchronizer and before receipt of any synchronization signal from a second synchronizer by the user terminal, and the method may further include controlling the user terminal to subsequently selectively listen for each of plural next synchronization signals, respectively transmitted by the second synchronizer and respectively defining when the user terminal is to selectively listen for advertiser transmitted advertisement packets within one or more advertisement windows defined by each of the plural next synchronization signals.

The method may further include controlling the synchronizer to transmit information related to the advertisement packet for receipt by a user terminal, the transmitted information being distinct from information included in the advertisement packet transmitted by advertiser.

Information included in the advertisement packet may be different from information, related to the advertisement packet, provided by the synchronizer to a user terminal configured to receive the transmitted advertising packet.

The method may further include predicting a next time duration corresponding to the preset time duration, based on a preset transmission interval for the advertisement packet, within which to transmit a next advertisement packet corresponding to the advertisement packet, adjusting a transmission time for transmitting the next advertisement packet so as to transmit the next advertisement packet within the predicted next time duration and transmitting the next advertisement packet at the adjusted transmission time, and entering a sleep mode a predetermined time immediately after the transmission of the next advertisement packet.

The method may further include controlling a user terminal to receive the synchronization signal, recognize the preset time duration, and selectively listen for the advertisement packet from the advertiser during the preset time duration.

The method may further include controlling the advertiser to listen for a connection request packet from the user terminal for a predetermined period of time immediately after the transmission of the advertisement packet, based on the advertisement packet being received by the user terminal during the preset time duration and the user terminal selectively transmitting the connection request packet to the advertiser requesting additional information regarding the received advertisement packet.

The method may further include controlling the user device to display information, on a display of the user terminal, about the advertisement packet, received during the selective listening, based on information included in the received advertisement packet.

The method may further include controlling a user terminal to receive the synchronization signal from the synchronizer, and controlling the user terminal to selectively listen for the transmitted advertisement packet based on the user terminal anticipating the transmission of the advertisement packet by the advertiser within the preset time duration, based on information about the preset time duration in the synchronization signal received by the user terminal.

The method may further include controlling the advertiser to listen for a connection request packet, from a user terminal responding to the transmitted advertisement packet, for a predetermined period immediately after the transmission of the advertisement packet, and controlling the advertiser to enter a sleep mode upon the predetermined period passing and no connection request packet having been received by the advertiser from the user terminal during the predetermined period.

One or more embodiments provide a method, including controlling a user terminal to receive a synchronization signal from a remote external synchronizer, controlling the user terminal to listen to a channel during a select preset time duration indicated by the received synchronization signal for one or more advertisement packets anticipated by the user terminal to have been transmitted during the select preset time duration by one or more advertisers, and displaying information, on a display of the user terminal, about one of the one or more advertisement packets, received during the listening of the channel, based on information included in the received one advertisement packet.

The displaying of the information about the one advertisement packet may include displaying information about the one advertisement packet that is included in the received synchronization signal.

The method may further include controlling the user terminal to transmit a connection request packet to the advertiser of the received one advertisement packet requesting additional information about information included in the received one advertisement packet or the received synchronization signal regarding the received one advertisement packet.

The method may further include switching an operation mode of the user terminal from an active mode to a sleep mode immediately after completion of an established communication between the user terminal and the advertiser resulting from the user terminal transmitting the connection request packet to the advertiser.

The method may further include adjusting at least one of an interval and a time for a listening for a next synchronization signal based on a determined amount of charge remaining in a battery of the user terminal and/or any power requirements of applications or processes operating in the user terminal.

The method may further include adjusting an interval and a time for the listening to the channel based on a determined amount of charge remaining in a battery of the user terminal and/or any power requirements of applications or processes operating in the user terminal.

The method may further include controlling the one or more advertisers to perform respective coarse synchronizations between respective advertiser transmission times of the one or more advertisement packets and the select preset time duration, and set respective transmission times of the one or more advertisement packets based on the respective coarse synchronizations, and controlling the one or more advertisers to transmit the one or more advertisement packets at the respective set transmission times.

The method may further include controlling one or more synchronizers, including the synchronizer, to transmit respective synchronization signals to the user terminal.

The controlling of the one or more synchronizers may include controlling a first synchronizer to transmit an initial synchronization signal, defining at least the select preset time duration, to the user terminal based on proximity of the user terminal and the first synchronizer and before receipt of any synchronization signal from a second synchronizer by the user terminal, and the method may further include controlling the user terminal to subsequently selectively listen for each of plural next synchronization signals, respectively transmitted by the second synchronizer and respectively defining when the user terminal is to selectively listen for advertiser transmitted advertisement packets within one or more advertisement windows defined by each of the plural next synchronization signals.

The method may further include recognizing that the user terminal is enabled to receive a location-based service using short-range communication technology based on the receipt of the synchronization signal.

The method may further include switching an operation mode of the user terminal from an active mode to a sleep mode immediately after the advertisement packet is received.

One or more embodiments provide a non-transitory recording medium including processor readable code to control at least one processing device to perform one or more embodiments discussed herein.

One or more embodiments provide an advertisement system, the system including an advertiser, including a receiver configured to receive a synchronization signal transmitted by a separate synchronizer of the advertisement system, a processor configured to perform a coarse synchronization between a transmission time of an advertisement packet and a preset time duration, indicated by the synchronization signal, to set the transmission time, and a transmitter configured to transmit the advertisement packet at the set transmission time.

The processor of the advertiser may be configured to set, based on the synchronization signal, a random time point within an advertisement window corresponding to a time duration in which the advertiser is anticipated by a user terminal of the advertisement system to transmit the advertisement packet, as the transmission time of the advertisement packet.

The transmitter of the advertiser may be configured to transmit the advertisement packet in a random slot among a plurality of preset slots of the advertisement window.

Respective advertisement transmission intervals, each representing an interval between preset time durations for select advertisement packets, may be differently set for each of plural advertisers of the advertisement system, including the advertiser, and the transmitter of the advertiser may be configured to transmit the advertisement packet at the set transmission time obtained by adding a random jitter to an advertisement transmission interval set for the advertisement packet.

The processor of the advertiser may be configured to predict a next time duration corresponding to the preset time duration, based on a preset transmission interval for the advertisement packet, within which to transmit a next advertisement packet corresponding to the advertisement packet, adjust a transmission time for transmitting the next advertisement packet so as to transmit the next advertisement packet within the predicted next time duration and transmitting the next advertisement packet at the adjusted transmission time, and enter a sleep mode a predetermined time immediately after the transmission of the next advertisement packet.

The advertisement system may further include a first synchronizer, as the synchronizer, including at least one processing device and corresponding communication device, configured to transmit an initial synchronization signal, defining at least the preset time duration, to a user terminal of the advertisement system based on proximity of the user terminal and the first synchronizer and before receipt of any synchronization signal from a second synchronizer of the advertisement system by the user terminal, the second synchronizer, including at least one processing device and corresponding communication device, configured to respectively transmit next synchronization signals at different times, and the user terminal, including at least one processing device and corresponding communication device, configured to selectively listen for advertisement packets, including listening for the advertisement packet transmitted by the advertiser based on the user terminal anticipating, based on the user terminal receiving the initial synchronization signal, when the advertiser transmits the advertisement packet, and including respectively listening for respective advertisement packets transmitted by the advertiser based the user terminal anticipating, based on the user terminal receiving the respectively transmitted next synchronization signals, when each of the respective advertisement packets are transmitted by the advertiser.

One or more embodiments provide an advertisement system, the system including a user terminal, including a processor configured to control the user terminal to listen to a channel during a select preset time duration indicated by a received synchronization signal for one or more advertisement packets anticipated by the user terminal to have been transmitted during the select preset time duration by one or more advertisers of the advertisement system, and a receiver configured to receive the synchronization signal and one of the one or more advertisement packets detected during the listening to the channel.

The user terminal may further include a display configured to display information about the one received advertisement packet based on information included in the received one advertisement packet.

The processor of the user terminal may be configured to adjust at least one of an interval and a time for a listening for a next synchronization signal based on a determined amount of charge remaining in a battery of the user terminal and/or any power requirements of applications or processes operating in the user terminal.

The advertisement system may further include the one or more advertisers, respectively including one or more processing devices and corresponding communication devices, respectively configured to perform respective coarse synchronizations between respective advertiser transmission times of the one or more advertisement packets and the select preset time duration, respectively set transmission times of the one or more advertisement packets based on the respective coarse synchronizations, and respectively transmit the one or more advertisement packets at the respective set transmission times.

Other features and aspects will be apparent from the following detailed description, the drawings, and the claims.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
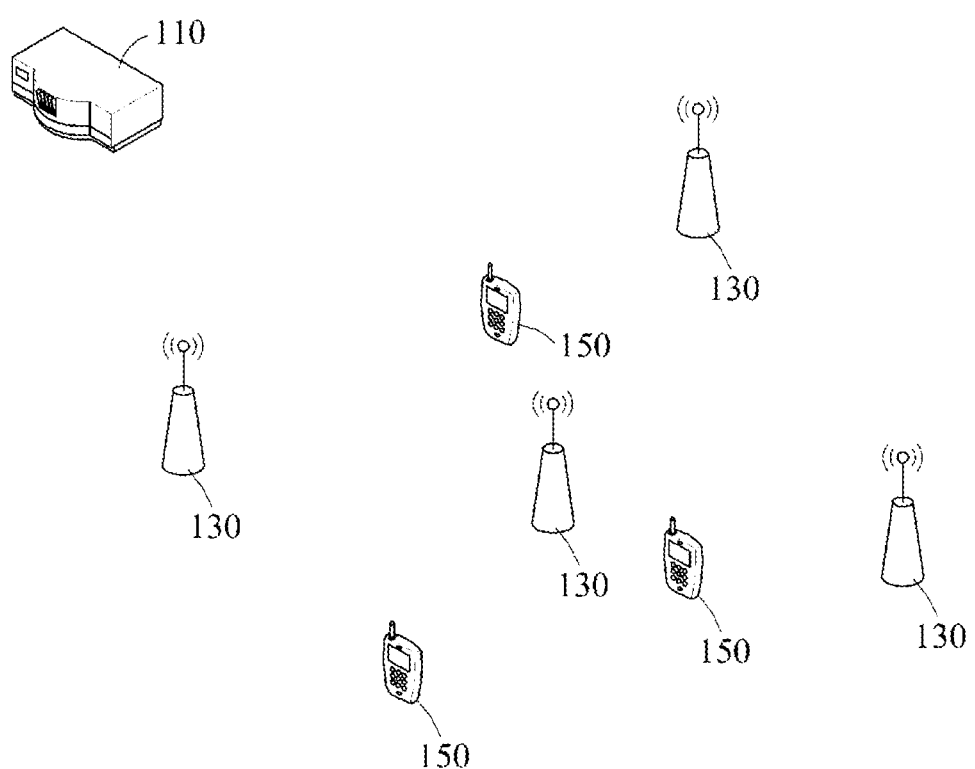
FIG. 1 illustrates a system to provide a location-based service, according to one or more embodiments.

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, and may be changed as will be apparent to one of ordinary skill in the art, with the exception of operations necessarily occurring in a certain order. In addition, descriptions of functions and constructions that may be well known to one of ordinary skill in the art may be omitted for increased clarity and conciseness.

The features described herein may be embodied in different forms, and are not to be construed as being limited to the examples described herein.

Various alterations and modifications may be made to the embodiments, some of which will be illustrated in detail in the drawings and detailed description. However, it should be understood that these embodiments are not construed as limited to the illustrated forms and include all changes, equivalents, or alternatives within the idea and the technical scope of this disclosure.

Terms used herein are to merely explain specific embodiments, thus are not meant to be limiting. A singular expression includes a plural expression except when two expressions are contextually different from each other. For example, as used herein, the singular forms "a," "an" and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude the existence of one or more other characteristics, figures, operations, components, elements or combinations thereof or additional possibilities.

Unless otherwise defined, all terms including technical and scientific terms used herein have the same meaning as commonly understood by one of ordinary skill in the art to which this invention may belong, in view of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, certain embodiments will be explained in more detail with reference to the attached drawings, wherein like reference numerals refer to like elements throughout. The drawings may not be to scale, and the relative size, proportions, and depiction of elements in the drawings may be exaggerated for clarity, illustration, and convenience. Like or the same component or components corresponding to each other will be provided with the same reference numeral, and their repeated detailed explanation may be omitted. In addition, when it is determined that a detailed description of a related or known function or configuration may make a purpose of an embodiment of the present disclosure unnecessarily ambiguous, such a detailed description may be omitted.

FIG. 1 illustrates a system to provide a location-based service, according to one or more embodiments.

Referring to FIG. 1, the system may include a synchronizer 110, an advertiser 130, and a user terminal 150, for example. Each of the advertiser 130 and the user terminal 150 may be provided in a single form, and may also be provided in a plural form as illustrated in FIG. 1, that is, there may be multiple user terminals 150 and a single advertiser 130, a single user terminal 150 and multiple advertisers 130, or a mixture of multiple user terminals 150 and multiple advertisers 130, as illustrated in FIG. 1. Similarly, there may than one synchronizer 110.

The synchronizer 110 may be configured to manage, for example, synchronization in an entire system that includes one or more user terminals 150 and one or more advertisers 130. The advertisers 130 may have fixed locations or be mobile, or include a mixture of fixed and mobile locations. In an embodiment, the synchronizer 110 may have little or no restrictions on its own energy consumption, as only an example. The synchronizer 110 may alternatively be mobile and may have power restrictions based on battery operation. In an embodiment, a plurality of synchronizers 110 may operate in conjunction and synchronization, for example, with each other to manage the system and thereby manage one or more advertisers 130 and user terminals 150 in the system, such as in the case when a single synchronizer 110 may not have sufficient range or capability to manage all advertisers 130 or user terminal 150 in the system. In addition, in an embodiment, the synchronizer 110 may itself be further configured to operate as an advertiser 130.

The synchronizer 110 may perform synchronization of a time at which the advertiser 130 will transmit an advertisement packet, which may identify the advertiser 130 to one or more of the user terminals 150. As only an example, the synchronizer 110 may be a wireless local area network (WLAN) access point (AP) disposed in the system in advance, to transmit a synchronization signal at a predetermined time interval, for example.

The advertiser 130 may transmit the advertisement packet to the user terminal 150 based on a performed coarse synchronization that is based on the synchronization signal received from the synchronizer 110. The advertiser 130 may be understood to be, for example, any of various types of devices that may indicate a presence of the device by transmitting such an advertisement packet to a user terminal 150, e.g., located within a predetermined short distance or range from the communication device for a short-range communication protocol embodiment.

Here, the term "coarsely synchronize/coarsely synchronizing/coarse synchronization" may not indicate that the advertiser 130 always transmits the advertisement packet at the exact same time. Rather, coarse synchronization means that the advertiser 130 transmits the advertisement packet at some time within a preset time duration, e.g., at a random time within that preset time duration. The preset time duration may be, for example, a preset advertisement window. The advertisement window may be understood to be, for example, a time duration in which the advertiser 130 may be allowed, permitted, controlled, or expected, to transmit the advertisement packet for one or more of the user terminals 150. Further descriptions related to the advertisement window will be provided with reference to FIG. 2.

For example, the coarse synchronization performed by the advertiser 130 may mean that the advertiser 130 sets a random point in time within the advertisement window as a transmission time for the advertisement packet, to thereby transmit the advertisement packet at the random point in time. In this example, the random point in time within the advertisement window may correspond to, for example, a random slot among a plurality of preset slots included or available in the advertisement window.

The advertiser 130 may operate using low power of a battery, for example, though the advertiser 130 may also operate according to a continuous power supply, or be available to operate using either of the battery and continuous power supply.

The advertiser 130 may determine the transmission time for a next advertisement packet by, for example, adding a random jitter value to an advertisement packet transmission interval. The advertisement packet transmission interval may be understood to be a time interval for transmitting the advertisement packet. For example, the advertisement packet may be transmitted at an interval of one advertisement window or at an interval of two or more advertisement windows, e.g., the advertisement packet may be transmitted every other advertisement window. The advertisement packet transmission interval may also be referred to as, for example, an advertisement window interval.

For example, the advertisement packet transmission interval may be 100 milliseconds (ms), and the random jitter may be a value arbitrarily selected from a range between −5 ms and 5 ms. The advertiser 130 may determine the next transmission time for the next advertisement packet to be after 103 ms have expired from the last advertisement packet or advertisement window, obtained by adding, for example, 3 ms selected as the random jitter to the 100 ms advertisement packet transmission interval. Here, the advertiser 130 may adjust the transmission time of the next advertisement packet to still be within a range of a subsequent advertisement window.

In an example, a plurality of advertisers including, for example, the advertiser 130 may coexist in the same area through a randomization of the transmission times of their respective advertisement packets. The same area may represent a coverage area of a WLAN or one or more connected AP's connected to, or acting as, the synchronizer 110, for example. Further descriptions related to a packet transmission procedure of the synchronizer 110, the advertiser 130, and the user terminal 150 will be provided with reference to FIG. 2.

The advertiser 130 and the user terminal 150 may receive the synchronization signal transmitted from the synchronizer 110 intermittently or receive the synchronization signal every advertisement window or for every synchronization signal transmitted by the synchronizer 110. The synchronization signal may be, for example, a beacon packet or a packet of a type similar to the beacon packet. Here, in an embodiment and only as an example, the synchronization signal received intermittently may be understood to be a synchronization signal received at an interval of three or five advertisement windows, under an assumption that the synchronizer 110 regularly transmits the synchronization signal for each advertisement window.

In an example, the advertiser 130 may predict a distortion generated for the coarse synchronization such as a clock drift based on, for example, a product standard and a manufacturer standard. As only examples, the advertiser 130 may intermittently receive the synchronization signal at an interval of every three minutes or every five advertisement windows in preparation for the predicted distortion, or loss of synchronization, of the coarse synchronization.

As noted above, previous typical non-synchronization schemes for receiving advertisement information include a user terminal continuously scanning/listening to a channel to receive an advertisement packet and the like, or such a user terminal operating on an independent duty cycle to control when to scan/listen for the example advertisement packet. Rather, in an embodiment, after the user terminal 150 obtains synchronization information, e.g., from the synchronizer 110, the user terminal 150 may minimize the needed time duration for scanning/listening the channel based on a synchronization signal that is intermittently scanned/listened for, from among multiple synchronization signals than may be transmitted by the synchronizer 110, or the synchronization signal that is scanned/listened for every time the synchronizer 110 is expected or anticipated to broadcast a synchronization signal, thereby minimizing power consumption. Herein, the phrased scan or listening to a channel may have the same meaning. Similarly, herein, a scanning or listening for a synchronization signal have the same meaning. Accordingly, the time or window of time that a user terminal 150 may actually need to discover an advertisement transmitted by an advertiser 130 may be dependent on when that advertisement is expected or anticipated to be transmitted by the advertiser 130, e.g., based on the synchronization information provided to the user terminal 150 by the synchronizer 110. So, in an embodiment, the transmission window of the advertisement by the advertiser 130 may not be independent of the discovery timing of the user terminal 150, which may result in the user terminal 150 having to be less active and more strategically choosing of when to operate to more efficiently preserve battery life.

As an example of an initial, or subsequent operation, starting in response to receipt of a synchronization signal transmitted from the synchronizer 110, the user terminal 150 may scan or listen for an advertisement channel for a preset time duration, then enter a sleep or non-discovery mode if no advertiser 130 is discovered, until the next preset time duration at which time the user terminal 150 may again scan the advertisement channel. If the user terminal 150 receives an advertisement from the advertiser 130 during the preset time duration, the user terminal 150 may, thus, now know or verify that the advertiser 130 is located adjacent or near the user terminal 150 based on the receipt of the advertisement.

A discovery success ratio, latency, and energy consumption of the user terminal 150 may be variable based on a period of scanning the channel and receiving the synchronization signal. Thus, the user terminal 150 may appropriately set a period of scanning or listening to the channel and receiving the synchronization signal based on an application requirement and an amount of charge remaining in a battery.

In response to the advertisement packet received from the advertiser 130, the user terminal 150 may transmit a connection request packet to the advertiser 130. For example, either automatically or based on user direction for additional information regarding information from the received advertisement packet displayed on the user terminal 150, the user terminal 150 may transmit the connection request packet to the advertiser 130 for additional information, and/or to provide information about the user to the advertiser 130, regarding the received advertisement packet. The connection request packet is used to set up a connection between the advertiser 130 and the user terminal 150. When the connection between the advertiser 130 and the user terminal 150 is set up or established, the advertiser 130 and the user terminal 150 may transmit and receive various items of data or information through another data channel in lieu of an advertisement channel. For example, in an embodiment, the advertiser 130 and the user terminal 150 may transmit and receive the data in a data channel according to on short-range low power communication technology or protocol. The example advertisement channel may be a set channel of such a short-range low power communication technology, or of another communication technology or protocol, as only examples. After and/or during the connection with the advertiser 130, the user terminal 150 may display information derived from the connection with the advertiser 130.

When the connection becomes blocked, e.g., due to a termination of data transmission and/or reception or a deviation from a communication range of the example short-range low power communication technology or protocol, the advertiser 130 and the user terminal 150 may again receive the synchronization signal from the synchronizer 110 to once again perform the synchronization with the entire system, and then again attempt communication with the advertiser 130 upon receipt of a next received advertisement from the advertiser 130. Upon such a disconnection between the advertiser 130 and the user terminal 150, the advertiser 130 and the user terminal 150 may perform always-on scanning or duty-cycled scanning to receive the next synchronization signal, to more quickly re-establish a connection between the advertiser 130 and the user terminal 150.

The user terminal 150 may be a terminal, a personal computer (PC), a tablet computer, a smartphone, a personal digital assistant (PDA), a wearable device, and a hub.

The synchronizer 110, the advertiser 130, and the user terminal 150 may each include a wireless internet interface, e.g., as their respective communication receiver and/or transmitter devices, such as one or more of a WLAN, a wireless fidelity (WiFi) direct, a digital living network alliance (DLNA), a wireless broadband (WiBro), a world interoperability for microwave access (WiMAX), and a high speed downlink packet access (HSDPA), and/or a short-range communication interface, for example, one or more of the Bluetooth™ standard protocols, a radio frequency identification (RFID), an infrared data association (IrDA), an ultra wideband (UWB), ZigBee, and a near field communication (NFC), as only non-limiting examples.

Figure 2:
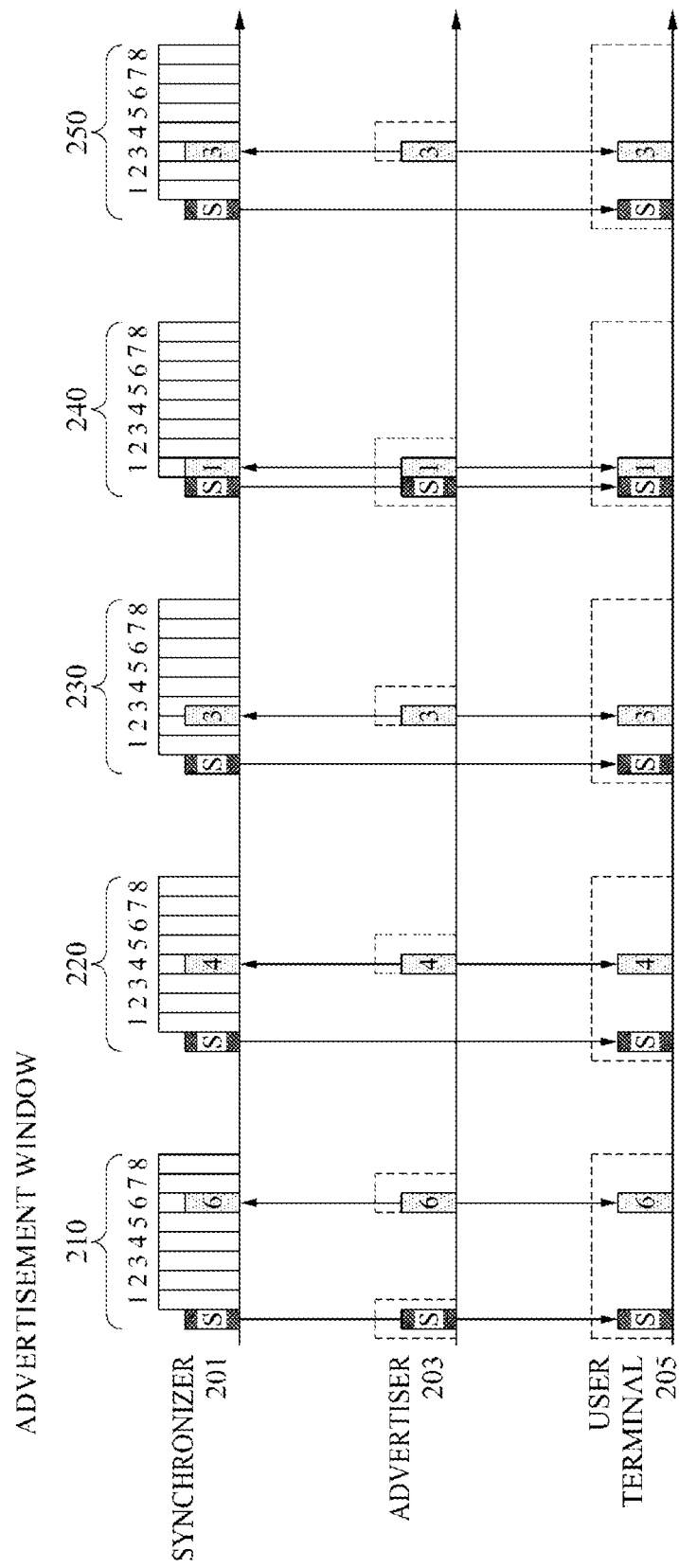
FIG. 2 illustrates a packet transmission procedure of a synchronizer, an advertiser, and a user terminal in a system, according to one or more embodiments.

FIG. 2 illustrates a packet transmission procedure of a synchronizer, an advertiser, and a user terminal in a system, such as for the synchronizer 110, an advertiser 130, and a user terminal 150 of FIG. 1, according to one or more embodiments.

Referring to FIG. 2, each of advertisement windows 210, 220, 230, 240, and 250 may include eight slots. Each of the advertisement windows 210, 220, 230, 240, and 250 may be understood to be a time duration in which advertisers 203 may be allowed, permitted, controlled, or expected to respectively transmit advertisement packets for receipt by the user terminal 205.

The illustrated block S, located in a foremost portion of each of the advertisement windows 210, 220, 230, 240, and 250 may represent a synchronization signal, for example, a beacon packet. The synchronization signal may be transmitted by the synchronizer 201, and accordingly, may be received by the advertiser 203 and the user terminal 205, according to a predetermined time interval. Here, the predetermined time interval may be an advertisement window interval, such as an interval between the advertisement window 210 and the advertisement window 220, e.g., an interval between the beginnings of different advertisement windows, or intervals between the endings of different advertisement windows, as only non-limiting examples. As only an example, any of the synchronization signals transmitted by the synchronizer 201 may be selectively received by scanned/listened for by the advertiser 203 or terminal 205 by beginning a scanning/listening of a channel a predetermined amount of time right before an expected advertisement window, or at some other expected or anticipated time or period that the advertiser 203 and terminal 205 may determine or be made aware of.

The advertiser 203 performs coarse synchronization by randomly transmitting an advertisement packet within an advertisement window for receipt by the user terminal 205, e.g., based on an intermittent receiving of the synchronization signal, for example, the illustrated block S, from the synchronizer 201. The intermittent receipt of the synchronization signal means that the advertiser may selectively listen for the transmitted synchronization signals from the synchronizer 201, e.g., so as to listen for every other synchronization signal transmitted by the synchronizer 201, every third transmitted synchronization signal, or every fourth transmitted synchronization signal as illustrated in FIG. 2, as only examples.

In the illustrations of FIG. 2, the lightly shaded blocks included in each of the advertisement windows 210, 220, 230, 240, and 250 indicate or represent respective preset slots during which an advertisement packet may be transmitted, or alternatively represent the underlying advertisement packet transmitted by the corresponding advertiser, for example, the advertiser 203, among a plurality of advertisers. The slots during which each advertiser may transmit their advertisements may be randomly selected for each of the advertisement windows 210, 220, 230, 240, and 250. For example, in one embodiment, an example eight different advertisers 203 may be set to transmit their respective advertisement packets using the slots of each of the advertisement windows. In such an example, each advertiser may transmit their respective advertisement packets in either particular or random slots of different or same advertisement windows. For example, an advertisement packet from one advertiser may be transmitted in the $6^{th}$ slot of the advertisement window 210, while an advertisement packet of another advertiser may be transmitted in a $4^{th}$ slot of the advertisement window 220. Additional examples regarding the advertisement windows and preset slots are discussed below for FIGS. 7-9.

In addition, among the example eight advertisers, based on the implemented coarse synchronization, two advertisers may respectively randomly transmit their advertisement packets at the same time in in the same slot of one advertisement window. In this example, a collision would accordingly occur in the example same slot between the advertisement packets transmitted from the two advertisers. Regardless, in an embodiment, irrespective of whether such a collision occurs, the example two advertisers may merely continue to transmit their advertisement packets in a next advertisement window or a further next advertisement window, as only examples, through their respective coarse synchronizations based on the respective transmission intervals set for each of the advertisers.

In an example, a plurality of advertisers may be classified as a group based on various classification references such as the product being sold, a theme, and the like. Further descriptions related to an example of grouping the plurality of advertisers will be provided with reference to FIG. 8.

As noted, the advertiser 203 may intermittently receive the synchronization signal to perform synchronization with an entire system including the synchronizer 201 and the user terminal 205, as represented by the receipt of the synchronization signal by the advertiser 203 in advertisement windows 210 and 240.

In FIG. 2, illustrated portions outlined with dotted lines, for the demonstrated advertiser 203 packet receptions and transmissions, represent respective periods of time during which the advertiser 203 may be in an awake or discovery mode, for example, where the synchronization signal may be scanned or listened for from the synchronizer 201, the advertisement packet may be transmitted, and a connection request packet may be received from the user terminal 205. As only an example, FIG. 2 demonstrates that after each advertisement packet is transmitted the advertiser 203 may be maintained awake or in a discover mode is maintained for a predetermined period of time, e.g., sufficient to receive such a connection request packet from a user terminal that may have received the advertisement packet. The advertiser 203 may enter a sleep mode during time durations other than the portions outlined with the dotted lines, for example, a time duration for receiving the synchronization signal and a time duration for transmitting the advertisement packet and receiving any connection request packet, thereby reducing energy consumption by the advertiser 203.

In the advertisement window 230, a difference may be generated in a process of synchronization between the synchronizer 201 and the advertiser 203, demonstrated in advertisement window 230 as the advertisement packet falling between the second and third slots, rather than within the third slot. Due to a clock drift between the synchronizer 201 and the advertiser 203, the degree of the difference between the synchronizer 201 and the advertiser 203 may increase over time. To correct for this difference, the advertiser 203 may receive the synchronization signal from the synchronizer 201 intermittently or receive the synchronization signal every advertisement window or for every synchronization signal transmitted by the synchronizer 201, to synchronize the synchronizer 201 and the advertiser 203 and, for example, remove clock drift therebetween.

When the clock drift occurs, as represented in the advertisement window 230, the advertiser 203 may be considered to have abnormally transmitted the advertisement packet due to the difference in the synchronization and thus, the user terminal 205 may also abnormally receive the advertisement packet.

In an embodiment, when the user terminal 205 receives the advertisement packet transmitted by the advertiser 203 according to the coarse synchronization in the advertisement window 230, the user terminal 205 may normally receive or accept the advertisement packet irrespective of whether there is a difference in synchronization between the synchronizer 201 and the advertiser 203, i.e., irrespective of whether the advertisement packet is sent in the wrong slot or at a time that overlaps slots of the advertisement window. In the advertisement window 230, as an example, the advertisement packet transmitted from an advertiser, based on its coarse synchronization, may have been intended to be transmitted in the $3^{rd}$ slot of the advertisement window 230, but actually transmitted the advertisement packet outside of the desired slot. However, as the advertisement packet is still transmitted within the advertisement window 230, the user terminal 205 may still normally receive and accept the advertisement packet irrespective of the synchronization difference between the synchronizer 201 and the advertiser 203.

In an example, the advertiser 203 may predict a distortion, such as the aforementioned clock drift generated in the coarse synchronization based on, for example, a product standard and a manufacturer standard. In this example, such distortion may be predicted to not occur, or sufficiently affect the coarse synchronization, until after a number of advertisement windows or advertisement packet transmissions have occurred, so a next synchronization signal may not be scanned or listened for until after a plurality of advertisement windows have passed since a previous synchronization was performed, e.g., based on the synchronization signal associated with the advertisement window 210. As only an example, FIG. 2 demonstrates an example where the next synchronization signal may be scanned or listened for right before or at, for example, a start time of the advertisement window 240. In response to each transmission of each advertisement packet, the advertiser 203 may switch its operation mode from an active mode to a sleep mode, which may require the advertiser 203 to switch its operation mode back from the sleep mode to the active mode at a point in time when the next synchronization signal is set to be listened for or a next start time of the advertisement window 240, for example. As noted, in an embodiment, the advertiser 203 may switch the operation mode to the active mode at a predetermined time before the start time of the advertisement window so as to receive the synchronization signal and perform synchronization again.

In response to a receiving of the advertisement packet transmitted from the advertiser 203, the user terminal 205 may transmit a connection request packet to the advertiser 203 within a predetermined period of time after receiving the advertisement packet, to request a connection with the advertiser 203, for example, related to the advertisement packet.

The advertiser 203 may predict a next time duration for the preset time duration, i.e., the advertisement window 250, based on the preset transmission interval of the advertisement packet. The advertiser 203 may then, accordingly, adjust a transmission time of the next advertisement packet to be within the next advertisement window 250. As an example, the advertiser 203 may transmit the next advertisement packet at a time obtained by adding a random jitter to a predicted start time of the advertisement window 250 or add or subtract a random jitter to a time corresponding to approximately a predicted middle of the advertisement window 250, so as to adjust the transmission time of the next advertisement packet to be within the advertisement window 250. The advertiser 203 may transmit the advertisement packet at the adjusted transmission time, and then enter the sleep mode.

The user terminal 205 may also receive the synchronization signal, for example, the illustrated block S, transmitted from the synchronizer 201, scan or listen to a channel based on the synchronization signal, and receive any found advertisement packets. The user terminal 205 may also enter a sleep mode in time intervals other than the advertisement window, illustrated with outlining with dotted lines for the user terminal 205, thereby reducing the energy consumption. In addition, as illustrated in FIG. 2, the user terminal 205 may selectively wake from any such sleep mode, or enter a corresponding discover mode, a predetermined time before the advertisement window so as to also receive the synchronization signal. Though every transmitted synchronization signal is demonstrated as being received by the user terminal 205, the user terminal 205 may selectively perform this additional scanning or listening for the synchronization signal, e.g., to receive every other or every third transmitted synchronization signal.

Figure 3:
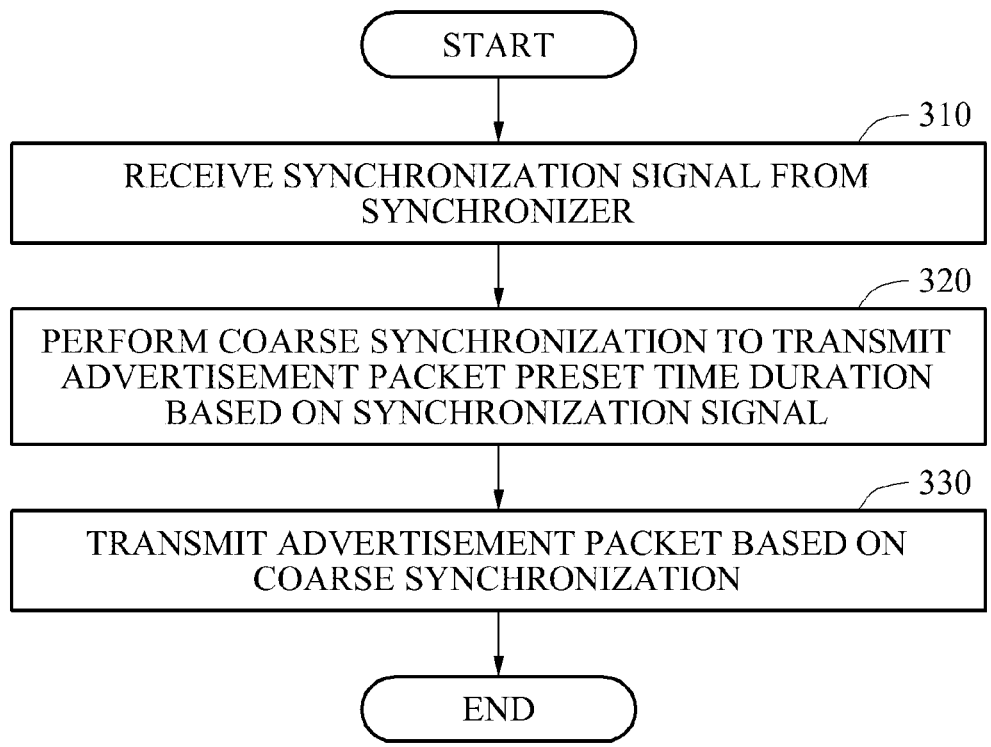
FIG. 3 illustrates an operation method of an advertiser, according to one or more embodiments.

FIG. 3 illustrates an operation method of an advertiser, according to one or more embodiments.

Referring to FIG. 3, in operation 310, an advertiser may receive a synchronization signal from a synchronizer. The synchronization signal may be used to perform a coarse synchronization, for determining a transmission time of an advertisement packet transmitted by the advertiser. The synchronization signal may be a beacon packet or a signal functioning similarly to the beacon packet, and may include a cycle or interval for the advertisement windows, a length of the advertisement window, and information on a shop or store related to the advertisement packet, as only non-limiting examples. The information on a shop, or retail establishment, may include for example, selling items of the shop related to the advertisement packet to be transmitted, a location of the shop, and events offered in the shop. The advertiser may receive the synchronization signal from the synchronizer intermittently or periodically.

In operation 320, the advertiser may perform the coarse synchronization, based on the synchronization signal, to determine when to transmit the advertisement packet in a preset time duration. In this example, the preset time duration may include a plurality of preset slots to be used for random advertisement packet transmissions of differing advertisers, for example. The preset time duration may be a time duration in which the advertiser is allowed, permitted, controlled, or expected to transmit the advertisement packet to any user terminals, for example, the aforementioned advertisement window.

Each of the advertisers may randomly transmit their advertisement packets using the plurality of slots. In operation 320, the advertiser may set a random point in time of the advertisement window as a transmission time of the advertisement packet. In this example, the random point in time may be, for example, a random slot among a plurality of slots included or available in the advertisement window.

In operation 330, the advertiser may transmit the advertisement packet based on the coarse synchronization, e.g., the advertiser transmits the advertisement packet in the random slot among the plurality of slots included in the advertisement window. The coarse synchronization by the advertiser may include transmitting the advertisement packet, for example, at a time obtained by adding a random jitter to an advertisement packet transmission interval. The transmission interval of the advertisement packet may be differently set for each advertiser.

Figure 4:
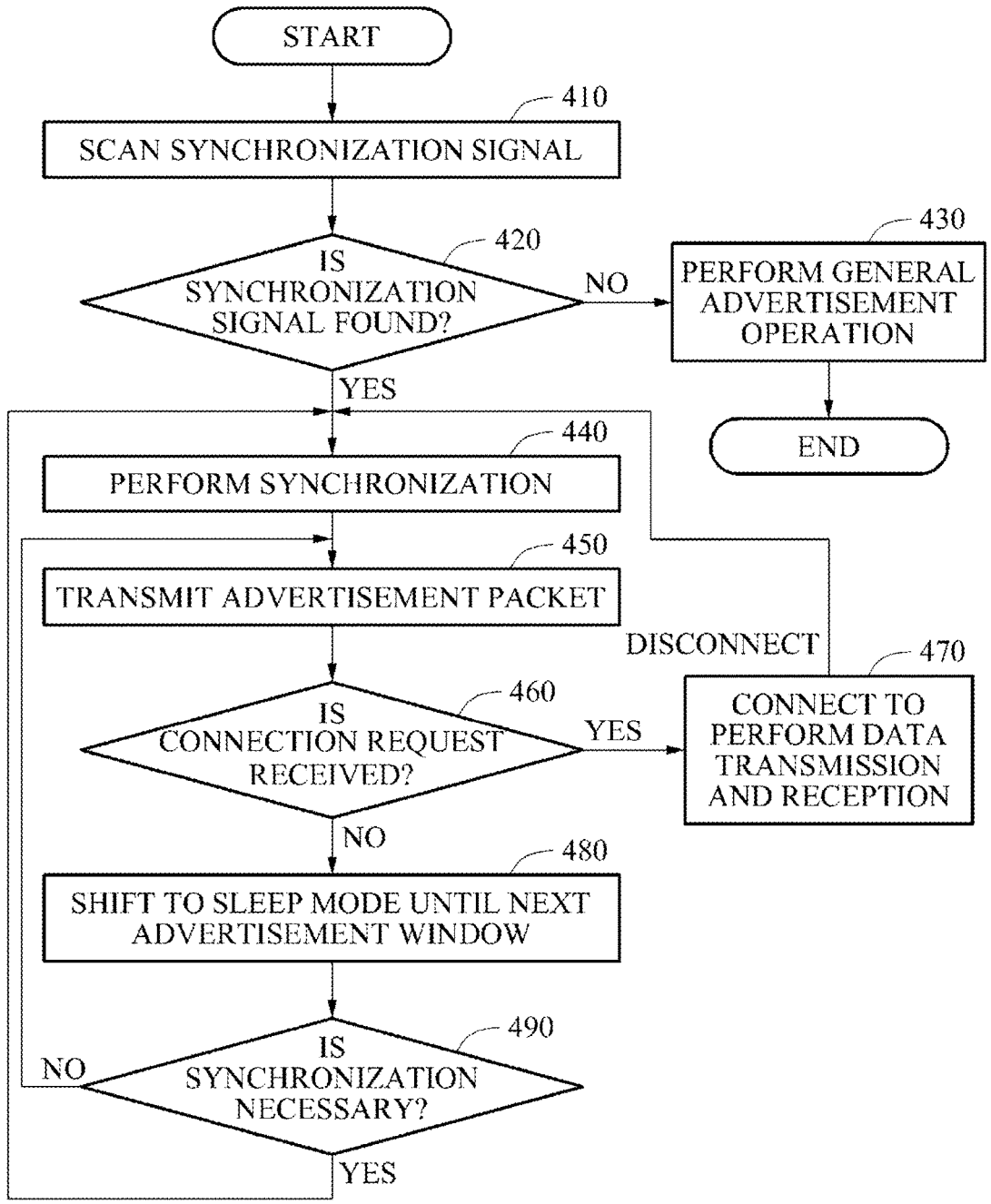
FIG. 4 illustrates an operation method of an advertiser, according to one or more embodiments.

FIG. 4 illustrates an operation method of an advertiser, according to one or more embodiments.

Referring to FIG. 4, in operation 410, the advertiser may scan or listen to a channel for a synchronization signal transmitted from a synchronizer, e.g., to verify whether a location-based service is to be provided using low power based on short-range communication technology, as only an example. In operation 420, the advertiser may verify whether the synchronization signal is found as a result of the scanning.

In operation 430, when the synchronization signal is not found, the advertiser may perform a general advertisement operation. The general advertisement operation may be, for example, an operation of transmitting an advertisement packet and receiving a connection request packet without performing synchronization.

When the synchronization signal is found, the advertiser may perform synchronization in operation 440, and then transmit the advertisement packet in a corresponding advertisement window after a random delay in operation 450.

In operation 460, the advertiser may determine whether a connection request packet is received from a user terminal, e.g., in response to the transmission of the advertisement packet. In this example, a connection between the advertiser and the user terminal may be requested using the connection request packet. When the connection request packet is received, in operation 470, the advertiser connects to, or establishes a connection with, the user terminal to perform data transmission and reception. When the data transmission and reception is terminated and the user terminal is disconnected from the advertiser, the advertiser may repeat the synchronization of operation 440.

When a connection request packet is not received, the advertiser may shift from an active mode to a sleep mode until a subsequent advertisement window in operation 480.

In operation 490, the advertiser may determine whether synchronization is necessary or desired, e.g., based upon an expiration of a predetermined time or a number of advertisement windows that may have passed since a previous synchronization.

When the synchronization is determined necessary or desired, the advertiser may perform the synchronization in operation 440. In this example, the advertiser may wake up earlier than a start time of the subsequent advertisement window to receive the synchronization signal, e.g., the synchronization signal of this subsequent advertisement window, thereby performing synchronization of clocks between the synchronizer and the advertiser.

Figure 5:
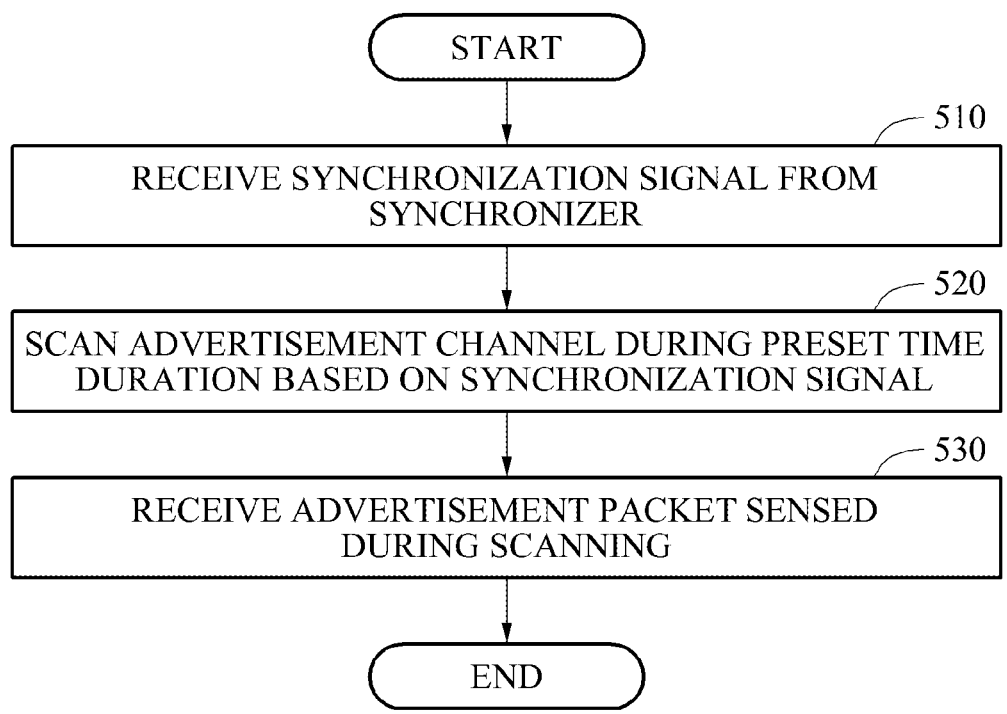
FIG. 5 illustrates an operation method of a user terminal, according to one or more embodiments.

FIG. 5 illustrates an operation method of a user terminal, according to one or more embodiments.

Referring to FIG. 5, in operation 510, the user terminal may receive a synchronization signal from a synchronizer. In an embodiment, for example, based on the synchronization signal received in operation 510, the user terminal may recognize that a location-based service based on a short-range communication technology or protocol is to be provided to the user terminal.

In operation 520, the user terminal may scan or listen to a channel, such as an advertisement channel, during a preset time duration based on the synchronization signal received in operation 510. Here, the preset time duration may be, for example, the aforementioned advertisement window. The user terminal may also adjust at least one of a period and time related to the scanning of the channel for an advertisement packet from an advertiser based on a determined amount of charge remaining in a battery of the user terminal and any requirements of any applications installed and/or operating in the user terminal.

In operation 530, the user terminal may receive an advertisement packet sensed during the scanning of operation 520. The advertisement packet may be transmitted based on coarse synchronization set by an advertiser, for example. The user terminal may switch an operation mode from an active mode to a sleep mode in response to the receiving of the advertisement packet.

In an example, by adjusting at least one of the period and the time related to the scanning for the synchronization signal based on an amount of charge determined to be remaining in a battery of the user terminal and any processing requirements of any applications installed and/or operating in the user terminal, the user terminal may reduce its energy consumption, as well as shorten discovery times for advertisers and improve discovery success rates, e.g., compared to systems where the user terminals may not know when to expect such synchronization signals and/or advertisement packets.

Figure 6:
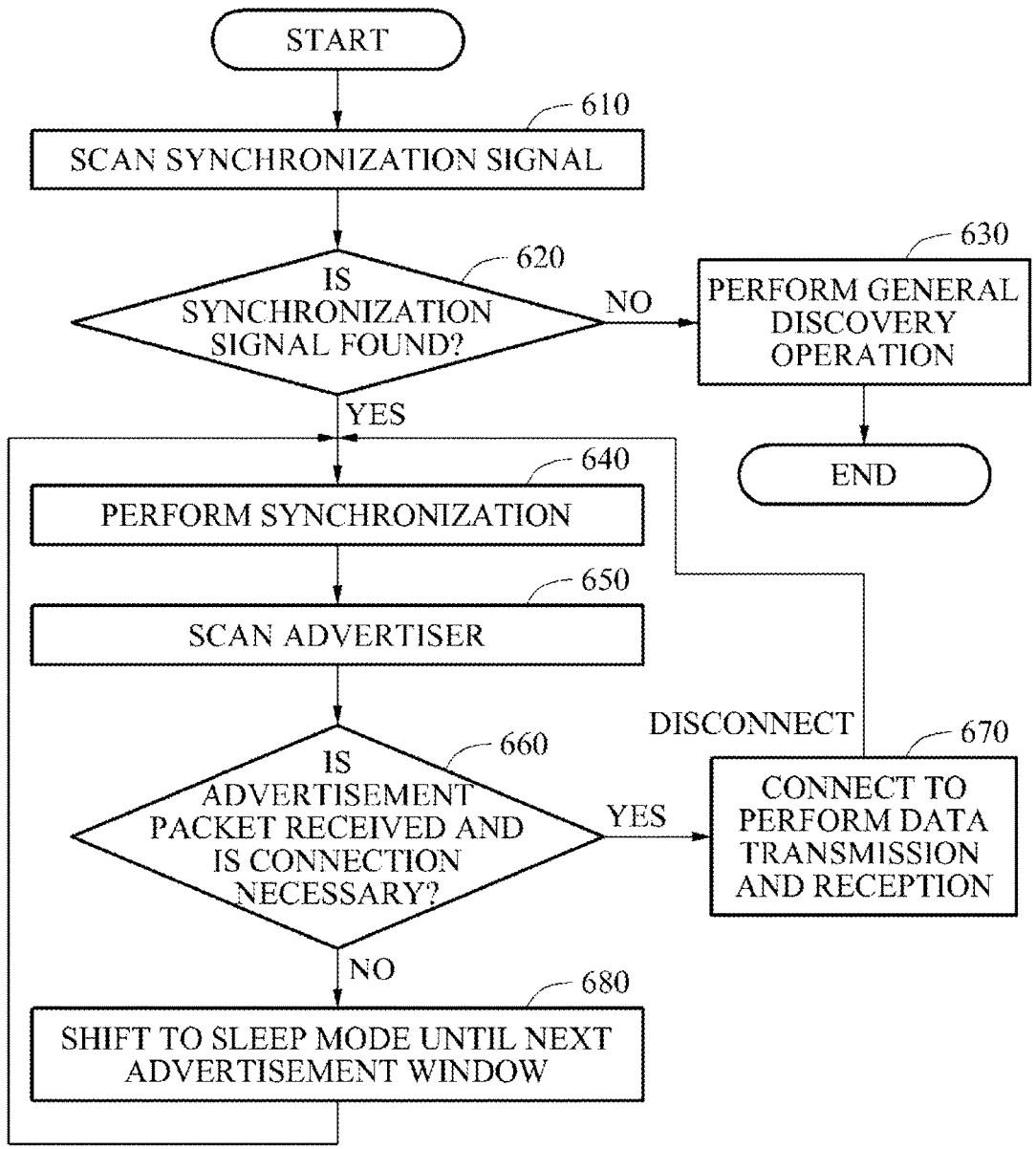
FIG. 6 illustrates an operation method of a user terminal, according to one or more embodiments.

FIG. 6 illustrates an operation method of a user terminal, according to one or more embodiments.

Referring to FIG. 6, in operation 610, the user terminal may scan or listen to a channel for a synchronization signal transmitted from a synchronizer, e.g., to verify whether a location-based service is to be provided using low power based on short-range communication technology, as only an example. In operation 620, the user terminal may verify whether the synchronization signal is found as a result of the scanning.

When the synchronization signal is not found, the user terminal may perform a general discovery operation in operation 630, and then terminate operations. The general discovery operation may be an operation of performing, for example, always-on scanning and duty-cycled scanning without performing synchronization as indicated above.

When the synchronization signal is found, the user terminal may perform synchronization in operation 640, and then scan or listen to a channel for an advertisement packet transmitted by an advertiser, e.g., an advertiser present in an adjacent area or range based on the type of communication protocol being implemented, in operation 650.

When an advertisement packet is received from the advertiser based on a result of the scanning of operation 650, the user terminal may determine whether a connection to the advertiser that transmitted the advertisement packet is necessary or desired in operation 660. The user terminal may determine that the connection is necessary or desired, such as in a case in which a user selects an advertisement phrase and a discount coupon delivered through the advertisement packet, as only a non-limiting example.

When the user terminal determines that the connection to the advertiser is necessary or desired in operation 660, the user terminal may connect to the advertiser to perform data transmission and reception in operation 670. When the user terminal becomes disconnected from the advertiser, which may lead to a termination of a current data transmission and reception, the user terminal may perform the synchronization again in operation 640.

When the user terminal determines that the connection to the advertiser is unnecessary or undesired in operation 660 the user terminal may shift to a sleep mode until a subsequent advertisement window in operation 680. After the sleep mode, the user terminal may perform the synchronization in operation 640 in a case in which the synchronization is necessary or desired, such as if a predetermined amount of time has passed, a predetermined number of advertisement windows have passed since a previous synchronization, or one or more advertisement packets are received in overlapping slots of one or more advertisement packets. For example, the user terminal may wake up earlier than a start time of a subsequent advertisement window to receive a next synchronization signal, thereby performing synchronization of a clock between the synchronizer and the user terminal.

Figure 7:
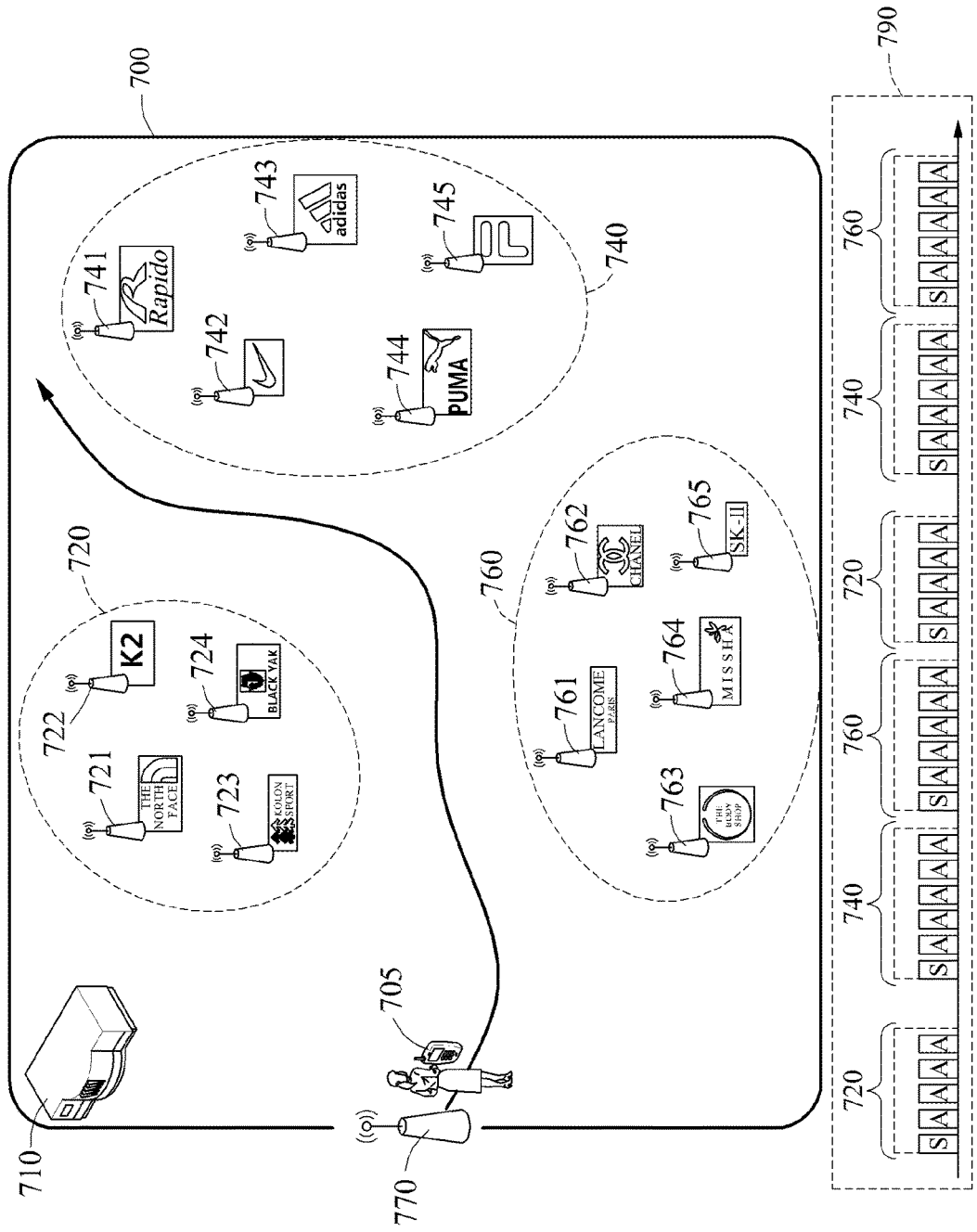
FIG. 7 illustrates a method of providing a location-based service, according to one or more embodiments.

FIG. 7 illustrates a method of providing a location-based service, according to one or more embodiments.

FIG. 7 illustrates an environment 700 in which the location-based service is provided using a user terminal 705, a synchronizer 710, and advertisers 721, 722, 723, 724, 741, 742, 743, 744, 745, 761, 762, 763, 764, and 765 in, for example, a department store. FIG. 7 may illustrate the location-based service that uses low power based on a short-range communication technology or protocol, as only an example.

The synchronizer 710 may transmit a synchronization signal to synchronize the user terminal 705, the advertisers 721, 722, 723, 724, 741, 742, 743, 744, 745, 761, 762, 763, 764, and 765, and an entrance synchronizer 770. Each of the advertisers 721, 722, 723, 724, 741, 742, 743, 744, 745, 761, 762, 763, 764, and 765 may perform respective coarse synchronizations by receiving the synchronization signal from the synchronizer 710 intermittently or by receiving the synchronization signal every advertisement window or for every synchronization signal transmitted by the synchronizer 710, and randomly transmit advertisement packets in an advertisement window set for a corresponding advertiser. In this example, the synchronization signal transmitted from the synchronizer 710 may include, for example, information indicating that the example low power location-based service is to be provided in a corresponding space such as a department store, a cycle of an advertisement window used in the department store, a length of the advertisement window, and information on a shop related to a particular advertisement packet. Here, as illustrated in FIG. 7, the synchronizer may be considered to be remote and exterior from both of the user terminal 705 and each of the advertisers 721, 722, 723, 724, 741, 742, 743, 744, 745, 761, 762, 763, 764, and 765.

The synchronizer 710 may provide information differing from the information included in advertisement packets to the user terminal 705. For example, the synchronizer 710 may provide information related to the advertisement packet to the user terminal 705. The information related to the advertisement packet may include a location of a shop transmitting the corresponding advertisement packet, products information, and discount sale information provided using the corresponding advertisement packet, as only examples. The synchronizer 710 may include the information related to the advertisement packet in the synchronization signal, and/or transmit this information to the user terminal 705 independently of the synchronization signal.

When a user carrying the user terminal 705 passes an entrance of the department store, for example, the user terminal 705 may receive such a synchronization signal from the synchronizer 710. The synchronization signal may be, for example, a beacon packet.

The user terminal 705 may receive the synchronization signal from the synchronizer 710 by performing, for example, always-on scanning and duty cycled scanning by the user terminal 705, e.g., based on the user terminal 705 knowing the general location of the user near the department store. Based on the information included in the synchronization signal, the user terminal 705 may recognize that the location-based service is to be provided in a corresponding area using low power based on the example short-range communication technology, for example. The user terminal 705 may switch an operation from an active mode, e.g., for the always-on scanning or duty cycled scanning, to a sleep mode after receipt of the synchronization signal.

The user terminal 705 may switch the operation mode from the sleep mode to an active mode in response to the expected advertisement window that was acknowledged through the synchronization signal, and perform scanning of a channel, such as an advertisement channel, while the active mode is maintained. Through this, the user terminal 705 may discover the advertisers 721, 722, 723, 724, 741, 742, 743, 744, 745, 761, 762, 763, 764, and 765 located in an adjacent area without long delays and while reducing energy consumption, e.g., compared to arrangements without such a synchronization approach.

Based on their respective discoveries, the user terminal 705 may establish connections with the respective advertisers 721, 722, 723, 724, 741, 742, 743, 744, 745, 761, 762, 763, 764, and 765 and receive various location-based services, for example, discount information and coupon information, from the advertisers 721, 722, 723, 724, 741, 742, 743, 744, 745, 761, 762, 763, 764, and 765.

In an example, an entrance synchronizer 770 may be installed at the entrance of the department store separately from synchronizer 710. When the entrance synchronizer 770 is installed, the user terminal 705 may receive a synchronization signal from the entrance synchronizer 770 when the user carrying the user terminal 705 passes the entrance of the department store. Based on the synchronization signal transmitted from the entrance synchronizer 770, the user terminal 705 may recognize that the location-based service is to be provided in a corresponding area using low power based on the example short-range communication technology, for example.

In an example, the synchronizer 710 and the entrance synchronizer 770 may function independently of one another, and the synchronizer 710 may also perform a function of the entrance synchronizer 770 as well as that of the synchronizer 710. When a plurality of synchronizers and a plurality of entrance synchronizers are provided, the synchronizers and the entrance synchronizers may operate in conjunction with one another, for example a clock of each of the synchronizers may be synchronized so that the user terminal 705 will be able to anticipate windows of time in which to expect advertisement packets and when additional synchronization signals may be available.

The user terminal 705 may perform the always-on scanning until a synchronization signal is received from the synchronizer 710, for example. When the user terminal 705 performing the always-on scanning receives the information included in the synchronization signal from the synchronizer 710, the user terminal 705 may be allowed, permitted, controlled, or expect to perform scanning only in during advertisement window intervals.

The advertisers 721, 722, 723, 724, 741, 742, 743, 744, 745, 761, 762, 763, 764, and 765 may respectively randomly transmit their advertisement packets to the user terminal 705 using a plurality of slots. In this example, the advertisers 721, 722, 723, 724, 741, 742, 743, 744, 745, 761, 762, 763, 764, and 765 are grouped based on a preset reference. In their appropriate advertisement windows, the advertisers 721, 722, 723, 724, 741, 742, 743, 744, 745, 761, 762, 763, 764, and 765 may transmit their respective advertisement packets for each shop corresponding to a group into which 721, 722, 723, 724, 741, 742, 743, 744, 745, 761, 762, 763, 764, and 765 are classified based on the preset reference.

For example, if it is assumed that activewear shops, sportswear shops, and cosmetic shops are located on a first floor of the department store, the advertisers 721, 722, 723, and 724 may transmit advertisement packets for the activewear shops, the advertisers 741, 742, 743, 744, and 745 may transmit advertisement packets for the sportswear shops, and the advertisers 761, 762, 763, 764, and 765 may transmit advertisement packets for the cosmetic shops.

For example, the respective advertisers 721, 722, 723, 724, 741, 742, 743, 744, 745, 761, 762, 763, 764, and 765 may be grouped for one or more corresponding themes or selling products. The advertisers 721, 722, 723, and 724 transmitting their advertisement packets for the activewear shops may be grouped as a first group 720. The advertisers 741, 742, 743, 744, and 745 transmitting their advertisement packets for the sportswear shops may be grouped as a second group 740. The advertisers 761, 762, 763, 764, and 765 transmitting their advertisement packets for cosmetic shops may be grouped as a third group 760. Each of the first group 720, the second group 740, and the third group 760 may be designated different advertisement windows, for example.

In FIG. 7, using dotted lines, the reference numeral 790 identifies a sequence of different advertisement windows, for example, a first advertisement window may be designated for the advertisers 721, 722, 723, and 724 included in the first group 720, a second advertisement window may be designated for the advertisers 741, 742, 743, 744, and 745 included in the second group 740, and a third advertisement window may be designated for the advertisers 761, 762, 763, 764, and 765 included in the third group 760. The advertisers 721, 722, 723, and 724 of the first group 720, the advertisers 741, 742, 743, 744, and 745 of the second group 740, and the advertisers 761, 762, 763, 764, and 765 of the third group 760 may transmit their advertisement packets in the first advertisement window, the second advertisement window, and the third advertisement window, respectively.

Figure 8:
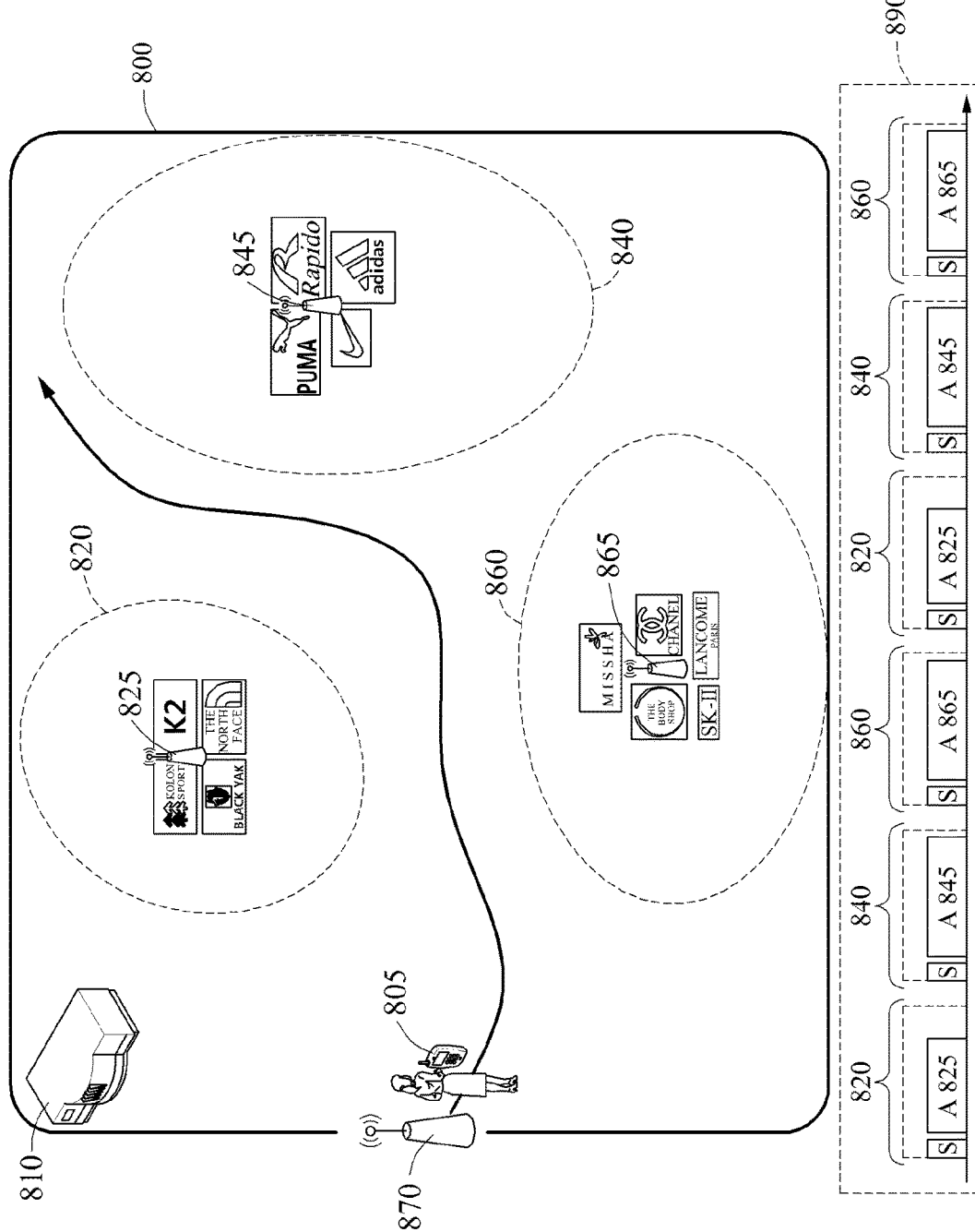
FIG. 8 illustrates a method of providing a location-based service, according to one or more embodiments.

FIG. 8 illustrates a method of providing a location-based service, according to one or more embodiments.

FIG. 8 illustrates an environment 800 in which a location-based service is provided using a user terminal 805, a synchronizer 810, and advertisers 825, 845, and 865 in a department store. FIG. 8 may illustrate the location-based service that uses low power based on a short-range communication technology or protocol, as only an example. In the example of FIG. 7, each shop may have included multiple advertisers transmitting advertisement packets. In contrast, advertisers 825, 845, and 865 may be used for each set group. The advertisers 825, 845, and 865 may respectively transmit advertisement packets for shops grouped based on a theme, for example.

The synchronizer 810 may transmit a synchronization signal to synchronize the user terminal 805, the advertisers 825, 845, and 865, and an entrance synchronizer 870. The advertisers 825, 845, and 865 receive the synchronization signal from the synchronizer 810 intermittently or receive the synchronization signal every advertisement window or for every synchronization signal transmitted by the synchronizer 810, perform respective coarse synchronization, and respectively randomly transmit the advertisement packets in set advertisement windows.

In addition, the entrance synchronizer 870 may be installed at the entrance of the department store separately, e.g., separate from the synchronizer 810. The entrance synchronizer 870 may transmits a synchronization signal to the user terminal 805 for when the user carrying the user terminal 805 passes the entrance of the department store.

If it is again assumed that activewear shops, sportswear shops, and cosmetic shops are located on a first floor of the department store, advertisement packets of shops grouped for each theme may be transmitted by one advertiser included in each group.

In FIG. 8, using dotted lines, the reference numeral 890 identifies a sequence of different advertisement windows, with the advertiser 825 transmitting an advertisement packet for a group 820 of the activewear shops in a first advertisement window and a fourth advertisement window, the advertiser 845 transmitting an advertisement packet for a group 840 of the sportswear shops in a second advertisement window and a fifth advertisement window, and the advertiser 865 transmitting an advertisement packet for a group 860 of cosmetic shops in a third advertisement window and a sixth advertisement window. In this example, each of the advertisement windows may include a plurality of slots provided for an advertisement packet for each of the shops located within coverage of an advertiser included in a corresponding group. For example, the first advertisement window may include four slots provided for advertisement packets of four activewear shops located within coverage of the advertiser 825, and the third advertisement window may include five slots provided for advertisement packets of five cosmetic shops located within coverage of the advertiser 865.

In an example, the user terminal 805 may recognize a time duration, for example, the third advertisement window, for receiving advertisement packets corresponding to the cosmetic shops based on the synchronization signal received from the synchronizer 810 or the entrance synchronizer 870. The user terminal 805 may receive the advertisement packet transmitted from the advertiser 865 in a preset time duration, for example, the third advertisement window. In this example, the advertiser 865 may wait for a predetermined period of time after transmission of the advertisement packet for any connection request packet transmitted from the user terminal 805 in response to the transmitted advertisement packet.

Figure 9:
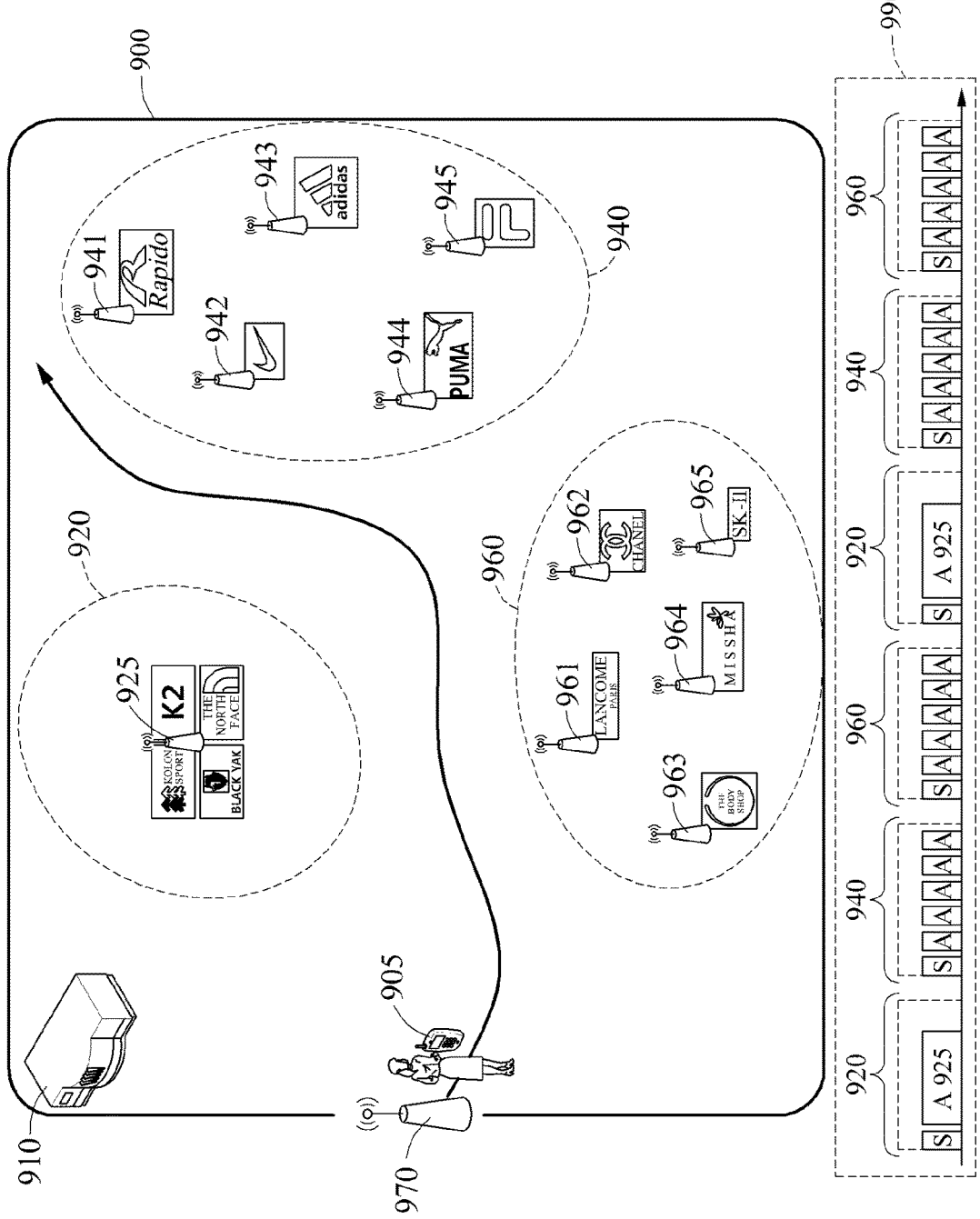
FIG. 9 illustrates a method of providing a location-based service, according to one or more embodiments.

FIG. 9 illustrates a method of providing a location-based service, according to one or more embodiments.

FIG. 9 illustrates an environment 900 in which a location-based service is provided using a user terminal 905, a synchronizer 910, and advertisers 925, 941, 942, 943, 944, 945, 961, 962, 963, 964, and 965. FIG. 9 may illustrate the location-based service that uses low power based on a short-range communication technology or protocol, as only an example.

The synchronizer 910 may transmit a synchronization signal to synchronize the user terminal 905, the advertisers 925, 941, 942, 943, 944, 945, 961, 962, 963, 964, and 965, and an entrance synchronizer 970. The advertisers 925, 941, 942, 943, 944, 945, 961, 962, 963, 964, and 965 may respectively receive the synchronization signal from the synchronizer 910 intermittently or receive the synchronization signal every advertisement window or for every synchronization signal transmitted by the synchronizer 910, respectively perform coarse synchronization, and respectively transmit advertisement packets at respective random points in time in a corresponding advertisement window.

In FIG. 9, using dotted lines, the reference numeral 990 identifies a sequence of different advertisement windows, for example, with the advertiser 925 transmitting an advertisement packet for shops included in a first group 920 in a first window advertisement window and a third advertisement window. In this example, the advertiser 925 may randomly transmit the advertisement packets for four activewear shops included in the first group 920 in the first advertisement window and the third advertisement window.

The advertisers 941, 942, 943, 944, and 945 may correspond to five shops included in a second group 940, and may transmit advertisement packets corresponding to the five shops. The advertisers 941, 942, 943, 944, and 945 may transmit the advertisement packets for the five shops included in the second group 940 in a second advertisement window and a fifth advertisement window.

Also, the advertisers 961, 962, 963, 964, and 965 may correspond to five shops included in a third group 960, and may transmit advertisement packets corresponding to the five shops. The advertisers 961, 962, 963, 964, and 965 may transmit the advertisement packets for the five shops included in the third group 960 in a third advertisement window and a sixth advertisement window.

Figure 10:
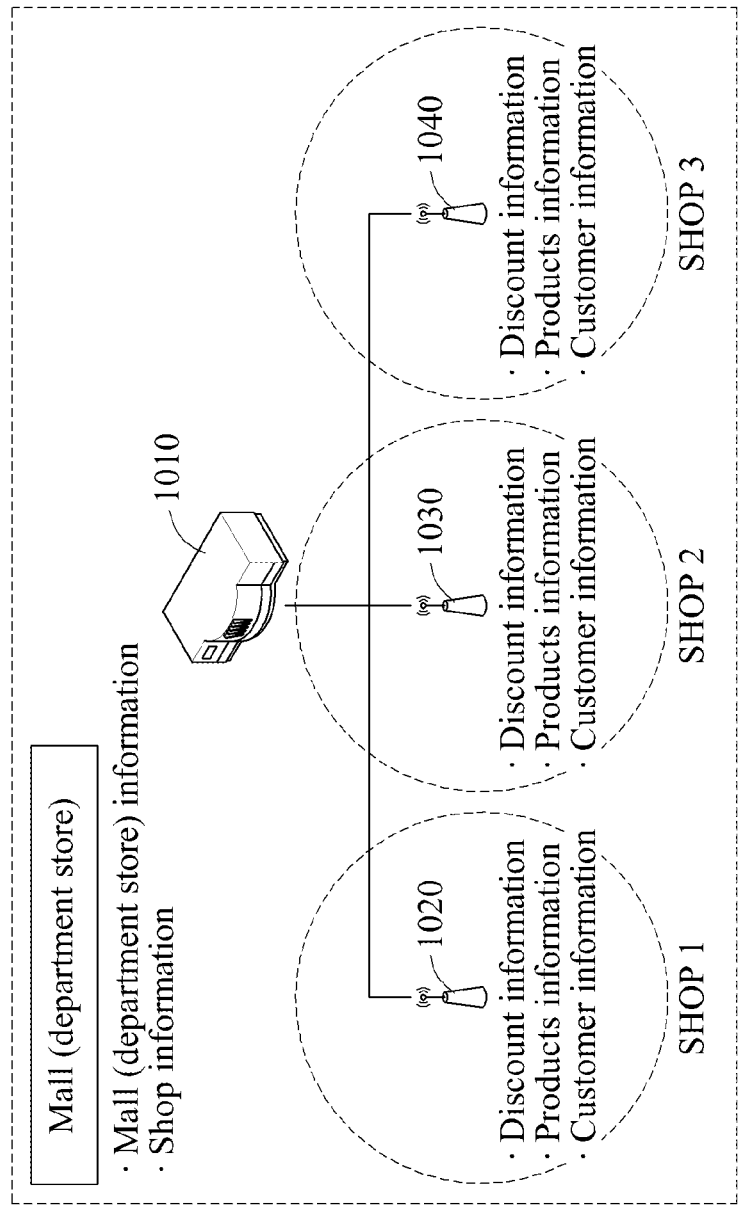
FIG. 10 illustrates an example of information transmitted from a synchronizer and an advertiser to a user terminal, e.g., based on short-range communication technology, according to one or more embodiments.

FIG. 10 illustrates an example of information transmitted from a synchronizer and an advertiser and to a user terminal, e.g., based on short-range communication technology, according to one or more embodiments.

FIG. 10 illustrates a synchronizer 1010 and advertisers 1020, 1030, and 1040, for example.

As an example, when the synchronizer 1010 is located in a department store, the synchronizer 1010 may provide information about the department store and information about shops in the department store to a user terminal. Additionally, the synchronizer 1010 may provide information related to the respective advertisement packets that will be transmitted from the advertisers 1020, 1030, and 1040 to the user terminal.

The synchronizer 1010 may transmit the aforementioned information to the user terminal by incorporating the information in a synchronization signal. Alternatively, the synchronizer 1010 may transmit the information to the user terminal independently of the synchronization signal.

The advertisers 1020, 1030, and 1040 may provide information on each shop to the user terminal when the user terminal moves into coverage of the advertisers 1020, 1030, and 1040. For example, the advertiser 1020 may transmit an advertisement packet for an ice cream shop, the advertiser 1030 may transmit an advertisement packet for a shoe shop, and the advertiser 1040 may transmit an advertisement packet for a bag shop.

The advertiser 1020 may provide information on a discount being offered or to be offered in the ice cream shop and information on products being offered in the ice cream shop, to a user through the corresponding advertisement packet. In addition, the advertiser 1020 may provide information for a predetermined customer and the information on the discount and the selling products to the user terminal. For example, when a customer A registered as a valued customer of the ice cream shop moves into the coverage of the advertiser 1020, the advertiser 1020 may provide that user terminal of the customer A with a combination of discount information and customer information indicated as, for example, "Thank you for your $4^{th}$ visit, customer A. Today, we are offering a 20% discount coupon for you." If the user desires to accept any offer, or desires additional information, in an embodiment the user interacts with a user interface of the user terminal and indicates the same, which may initiate a connection request being sent from the user terminal to the advertiser 1020 and a connection being established with the advertiser 1020 for additional information or additional sale or promotional material to be transmitted to the user terminal, as well as enabling selective information from the user terminal to be shared with the advertiser 1020.

Figure 11:
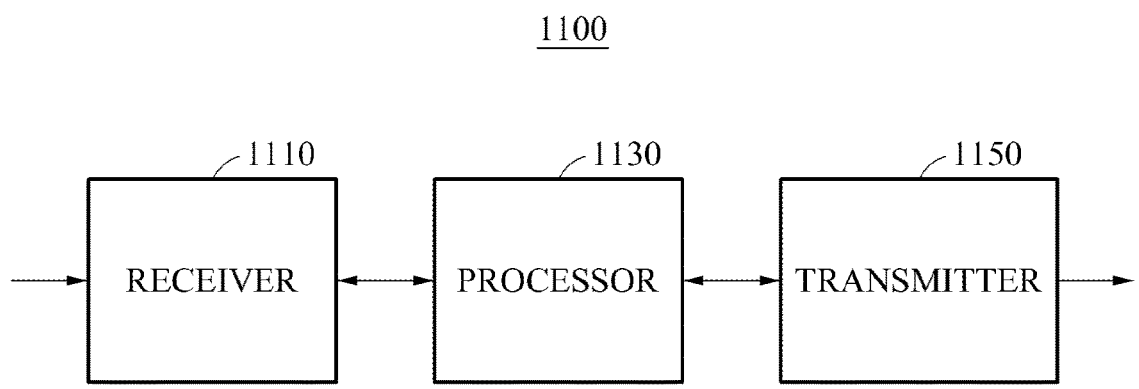
FIG. 11 illustrates an advertiser, according to one or more embodiments.

FIG. 11 illustrates an advertiser, according to one or more embodiments.

Referring to FIG. 8, an advertiser 1100 may include a receiver 1110, a processor 1130, and a transmitter 1150, for example.

The receiver 1110 may receive a synchronization signal from a synchronizer, for example. For example, the receiver 1110 may receive the synchronization signal from the synchronizer intermittently or receive the synchronization signal every advertisement window or for every synchronization signal transmitted by the synchronizer. The receiver 1110 may include an antenna and be configured to receive signals, such as receiving the synchronization signal from the synchronizer and for sharing information with a user terminal during an established connection.

Based on the synchronization signal, the processor 1130 may perform a coarse synchronization to transmit an advertisement packet in a preset time duration, e.g., in a preset advertisement window. The preset time duration may include a plurality of slots to be used for differing advertisers, for example.

The processor 1130 may set a random point in time, based on the synchronization signal, of the advertisement window as a transmission time for the advertisement packet. The processor 1130 may predict a next advertisement window based on a preset transmission interval of the advertisement packet, e.g., based on a known interval(s) between advertisement windows or known different interval times between advertisement windows for different advertisers or groups. The processor 1130 may further adjust a transmission time of a next advertisement packet to be within the next advertisement window, transmit the advertisement packet in the adjusted transmission time, and then enter a sleep mode. The processor 1130 may enter the sleep mode after a predetermined time after the transmission of the advertisement packet in case a user terminal sends a connection request to the advertiser 1100 in response to a receipt of the transmitted advertisement packet.

The transmitter 1150 may transmit the advertisement packet based on the coarse synchronization. The transmitter 1150 may transmit the advertisement packet at a time obtained by adding a random jitter to a transmission interval of the advertisement packet, which may be differently set for each advertiser. The transmitter 1150 may include an antenna or share the antenna of the receiver 1110.

The transmitter 1150 may transmit the advertisement packet to a random slot among the plurality of slots included in the advertisement window.

Figure 12:
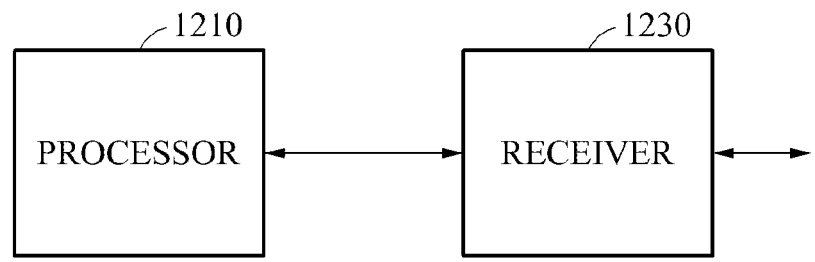
FIG. 12 illustrates a user terminal, according to one or more embodiments.

FIG. 12 illustrates a user terminal, according to one or more embodiments.

Referring to FIG. 12, a user terminal 1200 may include a processor 1210 and a receiver 1230, for example.

The processor 1210 may scan a channel during a preset time duration, e.g., an advertisement window, based on a synchronization signal received by the receiver 1110 from a synchronizer. The receiver 1230 may include an antenna and be configured to receive signals, such as receiving the synchronization signal from the synchronizer, receiving an advertisement packet from an advertiser, and receiving additional information from an advertiser during any established connection between the advertiser and the user terminal 1200. The processor 1210 may determine an amount of charge remaining in a battery of the user terminal 1200, and any requirement of any application installed and/or operating on the user terminal 1200, and may adjust, for example, a cycle and a time of scanning a channel for any advertisement packets and/or a cycle and a time of scanning for any additional synchronization signals based on the determined amount of charge remaining in the battery and any requirement of such applications installed and/or operating on the user terminal 1200.

The receiver 1230 may receive the synchronization signal and the advertisement packet detected during the scanning. In this example, the advertisement packet may have been transmitted based on the coarse synchronization set by the corresponding advertiser, for example. The user terminal 1200 may also similarly include a transmitter for communicating with the advertiser, for example.

Since the descriptions provided with reference to FIGS. 1 through 10 are also applicable to the operations and configurations of the advertiser 1100 and user terminal 1200 of FIGS. 11 and 12, respectively, repeated descriptions with respect to the advertiser 1100 of FIG. 11 and the user terminal 1200 of FIG. 12 will be omitted for increased clarity and conciseness.

In addition, apparatuses, units, modules, devices, and other components illustrated in FIGS. 1 and 7-12, for example, that may perform one or more operations described herein with respect to FIGS. 2-10, for example, are implemented by hardware components. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, controllers, sensors, memory, drivers, processing devices, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer execute code, instructions, or software, such as an operating system (OS) and one or more software applications that run on the OS, to perform the operations described herein with respect to FIGS. 2-10, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-10 that perform the operations described herein may be performed by a processing device, processor, or a computer as described above executing processor or computer readable code, instructions, or software to perform the operations described herein.

Processor or computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the processor or computer readable code, instructions, or software include machine code that is directly executed by the processing device, processor, or computer, such as machine code produced by a compiler. In another example, the processor or computer readable code, instructions, or software include higher-level code that is executed by the processing device, processor, or computer using an interpreter. Based on the disclosure herein, and after an understanding of the same, programmers of ordinary skill in the art can readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a processing device, processor, or computer to implement the hardware components, such as discussed in any of FIGS. 1 and 7-12, and perform the methods as described above in any of FIGS. 2-10, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As only an example, a processing device configured to implement a software or processor/computer readable code component to perform an operation A may include a processor programmed to run software or execute processor/computer readable code or instructions to control the processor to perform operation A. In addition, a processing device configured to implement a software or processor/computer readable code component to perform an operation A, an operation B, and an operation C may have various configurations, such as, for example, a processor configured to implement a software or processor/computer readable code component to perform operations A, B, and C; a first processor configured to implement a software or processor/computer readable code component to perform operation A, and a second processor configured to implement a software or processor/computer readable code component to perform operations B and C; a first processor configured to implement a software or processor/computer readable code component to perform operations A and B, and a second processor configured to implement a software or processor/computer readable code component to perform operation C; a first processor configured to implement a software or processor/computer readable code component to perform operation A, a second processor configured to implement a software or processor/computer readable code component to perform operation B, and a third processor configured to implement a software or processor/computer readable code component to perform operation C; a first processor configured to implement a software or processor/computer readable code component to perform operations A, B, and C, and a second processor configured to implement a software or processor/computer readable code component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

As a non-exhaustive example only, a system or apparatus as described herein, such as the respective advertiser 1100 or user terminal 1200 of FIGS. 11 and 12, as only examples, may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A method, the method comprising:
controlling an advertiser to receive a synchronization signal, transmitted by a remote external synchronizer;
performing a coarse synchronization to set a transmission time, for the advertiser to transmit an advertisement packet, within a preset time duration that is indicated by the synchronization signal;
controlling the advertiser to transmit the advertisement packet at the set transmission time; and
determining a point in time to listen for a next synchronization signal based on a determination of whether a predetermined number of intervals of the preset time duration, in which advertisement packets have been respectively transmitted by the advertiser, have passed since the transmitting of the advertisement packet,
wherein, in the performing of the coarse synchronization, the setting of the transmission time comprises setting, based on the synchronization signal, a random time point corresponding to a random slot within an advertisement window as the set transmission time.

2. The method of claim 1, further comprising:
controlling the advertiser to perform, at a select time later than the set transmission time and before another advertisement packet transmission by the advertiser, another coarse synchronization to set another transmission time of another advertisement packet; and
transmitting the other advertisement packet at the set other transmission time,
wherein the select time is based on a preset interval between one or more advertisement windows of the preset time duration that the advertisement packet and the other advertisement packet are respectively transmitted within.

3. A method, the method comprising:
controlling an advertiser to receive a synchronization signal transmitted by a remote external synchronizer;
performing a coarse synchronization to set a transmission time, for the advertiser to transmit an advertisement packet, within a preset time duration that is indicated by the synchronization signal;
controlling the advertiser to transmit the advertisement packet at the set transmission time;
controlling the advertiser to perform, at a select time later than the set transmission time and before another advertisement packet transmission by the advertiser, another coarse synchronization to set another transmission time of another advertisement packet, and transmit the other advertisement packet at the set other transmission time, where the select time is based on a preset interval between one or more advertisement windows of the preset time duration that the advertisement packet and the other advertisement packet are respectively transmitted within,
wherein, in the performing of the coarse synchronization, the setting of the transmission time comprises setting, based on the synchronization signal, a random time point corresponding to a random slot within an advertisement window as the set transmission time,
and
wherein the method further comprises:
determining whether to perform a re-synchronization of the advertiser and the synchronizer based on whether a predetermined period of time or preset number of advertisement windows have passed since a previous synchronization of the advertiser and the synchronizer;
controlling the advertiser to selectively listen for another synchronization signal from the synchronizer based on the determining of whether to perform the re-synchronization, the synchronizer having transmitted at least one intermediate synchronization signal available for reception by the advertiser since the advertiser received the synchronization signal and before receipt of the other synchronization signal;
setting a next transmission time of a next advertisement packet determined to be within the preset time duration based on the received other synchronization signal; and
transmitting the next advertisement packet, by the advertiser, at the set next transmission time.

4. The method of claim 1, further comprising:
changing an operation power mode of the advertiser to a lesser power using mode based on the transmitting of the advertisement packet;
changing the operation power mode of the advertiser to a greater power using mode at a select time, later than the set transmission time, and performing, at the greater power using mode, another coarse synchronization based on the synchronization signal to set another transmission time of another advertisement packet within a next time duration; and
transmitting the other advertisement packet at the set other transmission time,
wherein the select time is based on a preset interval between one or more advertisement windows of the preset time duration that the advertisement packet and the other advertisement packet are respectively transmitted.

5. The method of claim 1, wherein the performing of the coarse synchronization comprises setting, based on the synchronization signal, the random time point within the advertisement window corresponding to the preset time duration in which the advertiser is anticipated by a user terminal, of the one or more user terminals, to transmit the advertisement packet, as the transmission time of the advertisement packet, and where the synchronization signal is received within the advertisement window.

6. The method of claim 5, wherein the controlling of the transmitting of the advertisement packet comprises transmitting the advertisement packet in the random slot among a plurality of preset slots of the advertisement window.

7. The method of claim 1,
wherein respective advertisement transmission intervals, each representing an interval between same preset time durations for select advertisement packets, are differently set for each of plural advertisers, including the advertiser, and
wherein, in the controlling of the transmitting of the advertisement packet, the set transmission time is determined by adding a random jitter to an advertisement transmission interval set for the advertiser.

8. The method of claim 1, further comprising:
determining the point in time to listen for the next synchronization signal by determining a distortion, generated with respect to the coarse synchronization, indicating whether the advertiser and the synchronizer are no longer synchronized;
switching an operation mode of the advertiser from an active mode to a sleep mode a predetermined time immediately after the transmission of the advertisement packet; and
switching the operation mode of the advertiser from the sleep mode to the active mode, based on the determined point in time, to listen for the next synchronization signal.

9. The method of claim 1,
wherein the synchronization signal respectively comprises at least one of information indicating an interval of the advertisement window for the advertisement packet, information indicating a duration of the advertisement window, and information regarding a store related to the advertisement packet,
wherein the advertisement window corresponds to the preset time duration in which the advertiser transmits the advertisement packet.

10. The method of claim 9, wherein the advertisement window comprises a plurality of preset slots available for plural advertisers, including the advertiser, to provide respective advertisement packets of the plural advertisers within the advertisement window.

11. The method of claim 10, wherein each of the plural advertisers randomly transmits the respective advertisement packets within the advertisement window using any of the plurality of preset slots.

12. A method, the method comprising:
controlling an advertiser to receive a synchronization signal transmitted by a remote external synchronizer;
performing a coarse synchronization to set a transmission time, for the advertiser to transmit an advertisement packet, within a preset time duration that is indicated by the synchronization signal; and
controlling the advertiser to transmit the advertisement packet at the set transmission time,
wherein the synchronization signal respectively comprises at least one of information indicating an interval of the advertisement window for the advertisement packet, information indicating a duration of the advertisement window, and information regarding a store related to the advertisement packet,
wherein the advertisement window corresponds to the preset time duration in which the advertiser transmits the advertisement packet, and
wherein the advertisement window comprises a plurality of preset slots available for multiple advertisers, and wherein a plurality of advertisers, including the multiple advertisers, are grouped into different sets based on a preset reference, and a different advertisement window is designated for each set of the grouped advertisers, with the multiple advertisers being grouped within one set of the grouped advertisers and the advertisement window of the transmitted advertisement packet providing advertisement packets for the one set of the grouped advertisers differently from another advertisement window set to provide other advertisement packets of another set of the grouped advertisers.

13. The method of claim 12, further comprising controlling each of the multiple advertisers to respectively transmit each of the advertisement packets for the advertisement window, where the multiple advertisers are grouped as the one set of grouped advertisers based on each of the multiple advertisers representing related different stores.

14. The method of claim 1, wherein the advertisement window, corresponding to the preset time duration in which the advertiser transmits the advertisement packet, comprises a plurality of preset slots respectively provided for corresponding advertisement packets, of the respective advertisement packets, to be transmitted by the advertiser for each of one or more stores located within transmission coverage of the advertiser.

15. A method, the method comprising:
controlling an advertiser to receive a synchronization signal transmitted by a remote external synchronizer;
performing a coarse synchronization to set a transmission time, for the advertiser to transmit an advertisement packet, within a preset time duration that is indicated by the synchronization signal; and
controlling the advertiser to transmit the advertisement packet at the set transmission time,
wherein, in the performing of the coarse synchronization, the setting of the transmission time comprises setting, based on the synchronization signal, a random time point corresponding to a random slot within an advertisement window as the set transmission time, and
wherein the advertiser is controlled to receive the synchronization signal from the synchronizer, as a first synchronizer, to perform the coarse synchronization and to transmit the advertisement packet, and the advertiser is controlled to listen for another synchronization signal from a second synchronizer at a later time to transmit a later advertisement packet, with the advertiser having transmitted an additional advertisement packet, based on the synchronization signal from the first synchronizer, since the transmitting of the advertisement packet and before the listening for the other synchronization signal.

16. The method of claim 1, further comprising controlling the synchronizer to transmit information related to the advertisement packet for receipt by the one or more user terminals, the transmitted information being distinct from information included in the advertisement packet transmitted by advertiser.

17. The method of claim 1, wherein information included in the advertisement packet is different from information, related to the advertisement packet, provided by the synchronizer to the one or more user terminals configured to receive transmitted advertising packets.

18. The method of claim 1, further comprising:
predicting a time duration subsequent and corresponding to the preset time duration, based on a preset transmission interval for the advertisement packet, within which to transmit a next advertisement packet corresponding to the advertisement packet;
adjusting a transmission time for transmitting the next advertisement packet so as to transmit the next advertisement packet within the predicted time duration and transmitting the next advertisement packet at the adjusted transmission time; and
entering a sleep mode a predetermined time immediately after the transmission of the next advertisement packet.

19. The method of claim 1, further comprising controlling a user terminal, of the one or more user terminals, to receive the synchronization signal, recognize the preset time duration, and selectively listen for the advertisement packet from the advertiser during the preset time duration.

20. The method of claim 19, further comprising controlling the advertiser to listen for a connection request packet from the user terminal for a predetermined period of time immediately after the transmission of the advertisement packet, based on the advertisement packet being received by the user terminal during the preset time duration and the user terminal selectively transmitting the connection request packet to the advertiser requesting additional information regarding the received advertisement packet.

21. The method of claim 19, further comprising controlling the user terminal to display information, on a display of the user terminal, about the advertisement packet, received during the selective listening, based on information included in the received advertisement packet.

22. The method of claim 1, further comprising:
controlling a user terminal, of the one or more user terminals, to receive the synchronization signal from the synchronizer; and
controlling the user terminal to selectively listen for the transmitted advertisement packet based on the user terminal anticipating the transmission of the advertisement packet by the advertiser within the preset time duration, based on information about the preset time duration in the synchronization signal received by the user terminal.

23. The method of claim 1, further comprising:
controlling the advertiser to listen for a connection request packet; from a user terminal, of the one or more user terminals, responding to the transmitted advertisement packet, for a predetermined period immediately after the transmission of the advertisement packet; and
controlling the advertiser to enter a sleep mode upon the predetermined period passing and no connection request packet having been received by the advertiser from the user terminal during the predetermined period.

24. A non-transitory recording medium comprising processor readable code to control at least one processing device to perform the method of claim 1.

25. A method, the method comprising:
controlling a user terminal to receive a synchronization signal from a remote external synchronizer;
controlling the user terminal to listen to a channel during a preset time duration indicated by the received synchronization signal for one or more advertisement packets anticipated by the user terminal to have been transmitted during the preset time duration by one or more advertisers; and
displaying information, on a display of the user terminal, about one of the one or more advertisement packets, received during the listening of the channel, based on information included in the received one advertisement packet,
wherein the displaying of the information about the one advertisement packet includes displaying information about the one advertisement packet that is included in the received synchronization signal.

26. A method, the method comprising:
controlling a user terminal to receive a synchronization signal from a remote external synchronizer;
controlling the user terminal to listen to a channel during a preset time duration indicated by the received synchronization signal for one or more advertisement packets anticipated by the user terminal to have been transmitted during the preset time duration by one or more advertisers; and
displaying information, on a display of the user terminal, about one of the one or more advertisement packets, received during the listening of the channel, based on information included in the received one advertisement packet,
further comprising controlling the user terminal to transmit a connection request packet to the advertiser of the received one advertisement packet requesting additional information about information included in the received one advertisement packet or the received synchronization signal regarding the received one advertisement packet.

27. The method of claim 26, further comprising:
switching an operation mode of the user terminal from an active mode to a sleep mode immediately after completion of an established communication between the user terminal and the advertiser resulting from the user terminal transmitting the connection request packet to the advertiser.

28. The method of claim 26, further comprising:
adjusting at least one of an interval and a time for a listening for a next synchronization signal based on a determined amount of charge remaining in a battery of the user terminal and/or any power requirements of applications or processes operating in the user terminal.

29. The method of claim 26, further comprising:
adjusting an interval or a time for the listening to the channel based on a determined amount of charge remaining in a battery of the user terminal and/or any power requirements of applications or processes operating in the user terminal.

30. The method of claim 26, further comprising controlling one or more synchronizers, including the synchronizer, to transmit respective synchronization signals to the user terminal.

31. The method of claim 30,
wherein the controlling of the one or more synchronizers includes controlling a first synchronizer to transmit an initial synchronization signal, defining at least the preset time duration, to the user terminal based on proximity of the user terminal and the first synchronizer and before receipt of any synchronization signal from a second synchronizer by the user terminal, and
the method further comprises controlling the user terminal to subsequently selectively listen for each of plural next synchronization signals, respectively transmitted by the second synchronizer and respectively defining when the user terminal is to selectively listen for advertiser transmitted advertisement packets within one or more advertisement windows defined by each of the plural next synchronization signals.

32. The method of claim 26, further comprising:
recognizing that the user terminal is enabled to receive a location-based service using short-range communication technology based on the receipt of the synchronization signal.

33. The method of claim 26, further comprising:
switching an operation mode of the user terminal from an active mode to a sleep mode immediately after the advertisement packet is received.

34. An advertisement system, the system comprising:
an advertiser, including:
a receiver configured to receive a synchronization signal transmitted by a separate synchronizer of the advertisement system;
a processor configured to
perform a coarse synchronization to set a transmission time of an advertisement packet within a preset time duration that is indicated by the synchronization signal, to set the transmission time, and
determine a point in time to listen for a next synchronization signal based on a determination of whether a predetermined number of intervals of the preset time duration, in which advertisement packets have been respectively transmitted by the advertiser, have passed since the transmitting of the advertisement packet; and
a transmitter configured to transmit the advertisement packet at the set transmission time,
wherein, for the setting of the transmission time in the coarse synchronization, the processor is configured to set, based on the synchronization signal, a random time point corresponding to a random slot within an advertisement window as the set transmission time.

35. The advertisement system of claim 34, wherein the processor of the advertiser is configured to set, based on the synchronization signal, the random time point within the advertisement window corresponding to a time duration in which the advertiser is anticipated by a user terminal, of the one or more user terminals and of the advertisement system, to transmit the advertisement packet, as the transmission time of the advertisement packet, where the synchronization signal is received within the advertisement window.

36. The advertisement system of claim 35, wherein the transmitter of the advertiser is configured to transmit the advertisement packet in the random slot among a plurality of preset slots of the advertisement window.

37. The advertisement system of claim 34, wherein respective advertisement transmission intervals, each representing an interval between preset time durations for select advertisement packets, are differently set for each of plural advertisers of the advertisement system, including the advertiser, and the transmitter of the advertiser is configured to transmit the advertisement packet at the set transmission time obtained by adding a random jitter to an advertisement transmission interval set for the advertisement packet.

38. The advertisement system of claim 34, wherein the processor of the advertiser is configured to predict a time duration subsequent and corresponding to the preset time duration, based on a preset transmission interval for the advertisement packet, within which to transmit a next advertisement packet corresponding to the advertisement packet, adjust a transmission time for transmitting the next advertisement packet so as to transmit the next advertisement packet within the predicted time duration and transmitting the next advertisement packet at the adjusted transmission time, and enter a sleep mode a predetermined time immediately after the transmission of the next advertisement packet.

39. The advertisement system of claim 38, further comprising:

a first synchronizer, as the synchronizer, including at least one processing device and corresponding communication device, configured to transmit an initial synchronization signal, defining at least the preset time duration, to a user terminal, of the one or more user terminals and of the advertisement system, based on proximity of the user terminal and the first synchronizer and before receipt of any synchronization signal from a second synchronizer of the advertisement system by the user terminal;

the second synchronizer, including at least one processing device and corresponding communication device, configured to respectively transmit next synchronization signals at different times; and the user terminal, including at least one processing device and corresponding communication device, configured to selectively listen for advertisement packets, including listening for the advertisement packet transmitted by the advertiser based on the user terminal anticipating, based on the user terminal receiving the initial synchronization signal, when the advertiser transmits the advertisement packet, and including respectively listening for corresponding advertisement packets transmitted by the advertiser based the user terminal anticipating, based on the user terminal receiving the respectively transmitted next synchronization signals, when each of the corresponding advertisement packets are transmitted by the advertiser.

40. An advertisement system, the system comprising:
a user terminal, including:
a processor configured to control the user terminal to listen to a channel during a preset time duration indicated by a received synchronization signal for one or more advertisement packets anticipated by the user terminal to have been transmitted during the preset time duration by one or more advertisers of the advertisement system; and
a receiver configured to receive the synchronization signal and one of the one or more advertisement packets detected during the listening to the channel, wherein the processor is further configured to control the user terminal to transmit a connection request packet to an advertiser of the received one advertisement packet requesting additional information about information included in the received one advertisement packet or the received synchronization signal regarding the received one advertisement packet.

41. The advertisement system of claim 40, the user terminal further comprising a display configured to display information about the one received advertisement packet based on the information included in the received one advertisement packet.

42. The advertisement system of claim 40, wherein the processor of the user terminal is configured to adjust at least one of an interval and a time for a listening for a next synchronization signal based on a determined amount of charge remaining in a battery of the user terminal and/or any power requirements of applications or processes operating in the user terminal.

43. The advertisement system of claim 40, further comprising:

the one or more advertisers, respectively including one or more processing devices and corresponding communication devices, respectively configured to perform respective coarse synchronizations between respective advertiser transmission times of the one or more advertisement packets and the preset time duration, respectively set transmission times of the one or more advertisement packets based on the respective coarse synchronizations, and respectively transmit the one or more advertisement packets at the respective set transmission times.

44. The method of claim 1, wherein the controlling of the advertiser to receive the synchronization signal comprises controlling the advertiser to intermittently listen for the synchronization signal transmitted by the synchronizer or to listen for every synchronization signal transmitted by the synchronizer.

45. The method of claim 2, further comprising:
determining whether to perform a re-synchronization of the advertiser and the synchronizer based on whether a predetermined period of time or preset number of advertisement windows have passed since a previous synchronization of the advertiser and the synchronizer;
controlling the advertiser to selectively listen for another synchronization signal from the synchronizer based on the determining of whether to perform the re-synchronization, the synchronizer having transmitted at least one intermediate synchronization signal available for reception by the advertiser since the advertiser received the synchronization signal and before receipt of the other synchronization signal;
setting a next transmission time of a next advertisement packet determined to be within the preset time duration based on the received other synchronization signal; and
transmitting the next advertisement packet, by the advertiser, at the set next transmission time.

46. The method of claim 9, wherein the advertisement window comprises a plurality of preset slots available for multiple advertisers, and wherein a plurality of advertisers, including the multiple advertisers, are grouped into different sets based on a preset reference, and a different advertisement window is designated for each set of the grouped advertisers, with the multiple advertisers being grouped within one set of the grouped advertisers and the advertisement window of the transmitted advertisement packet providing plural advertisement packets for the one set of the grouped advertisers differently from another advertisement window set to provide other plural advertisement packets of another set of the grouped advertisers.

47. The method of claim 46, further comprising controlling each of the multiple advertisers to respectively transmit each of the plural advertisement packets for the advertisement window, where the multiple advertisers are grouped as the one set of grouped advertisers based on each of the multiple advertisers representing related different stores.

48. The method of claim 1, wherein the advertiser is controlled to receive the synchronization signal from the synchronizer, as a first synchronizer, to perform the coarse synchronization and to transmit the advertisement packet, and the advertiser is controlled to listen for another synchronization signal from a second synchronizer at a later time to transmit a later advertisement packet, with the advertiser having transmitted an additional advertisement packet, based on the synchronization signal from the first synchronizer, since the transmitting of the advertisement packet and before the listening for the other synchronization signal.

49. The method of claim 1, further comprising controlling the advertiser to listen for a connection request from a user terminal, of the one or more user terminals, responding to a receipt of the transmitted advertisement packet by the user terminal.

50. The method of claim 49, wherein receipt of the connection request responding to the receipt of the transmitted advertisement packet by the user terminal is dependent on receipt of the synchronization signal by the user terminal.

51. A method, the method comprising:
controlling an advertiser to receive a synchronization signal transmitted by a remote external synchronizer;
performing a coarse synchronization to set a transmission time, for the advertiser to transmit an advertisement packet, within a preset time duration that is indicated by the synchronization signal;
controlling the advertiser to transmit the advertisement packet at the set transmission time; and
controlling the advertiser to listen for a connection request from a user terminal, distinguished from the remote external synchronizer, responding to a receipt of the transmitted advertisement packet by the user terminal and based on receipt of the synchronization signal, or a previous synchronization signal, by the user terminal.

52. The method of claim 51, wherein the controlling of the advertiser to listen for the connection request from the user terminal comprises controlling the advertiser to listen for the connection request packet for a predetermined period of time immediately after the transmission of the advertisement packet, based on the advertisement packet being received by the user terminal during a preset time duration indicated by the synchronization signal and the user terminal selectively transmitting the connection request packet to the advertiser requesting additional information regarding the received advertisement packet.

53. The method of claim 51, wherein receipt of the connection request responding to the receipt of the transmitted advertisement packet by the user terminal is dependent on the receipt of the synchronization signal by the user terminal.

* * * * *